United States Patent
Yu et al.

(10) Patent No.: US 9,765,864 B2
(45) Date of Patent: *Sep. 19, 2017

(54) WINDOW SHADE AND ITS CONTROL MODULE

(71) Applicant: TEH YOR CO., LTD., Taipei (TW)

(72) Inventors: Fu-Lai Yu, New Taipei (TW); Chin-Tien Huang, New Taipei (TW)

(73) Assignee: Teh Yor Co., Ltd. (TW)

(*) Notice: Subject to any disclaimer, the term of this patent is extended or adjusted under 35 U.S.C. 154(b) by 0 days.

This patent is subject to a terminal disclaimer.

(21) Appl. No.: 14/868,990

(22) Filed: Sep. 29, 2015

(65) Prior Publication Data

US 2016/0017964 A1   Jan. 21, 2016

Related U.S. Application Data

(63) Continuation-in-part of application No. 13/484,530, filed on May 31, 2012, now Pat. No. 9,187,951.

(30) Foreign Application Priority Data

Feb. 23, 2012   (TW) .............................. 101106084 A

(51) Int. Cl.
*E06B 9/322*   (2006.01)
*F16H 19/06*   (2006.01)
(Continued)

(52) U.S. Cl.
CPC .............. *F16H 19/06* (2013.01); *E06B 9/32* (2013.01); *E06B 9/322* (2013.01); *E06B 9/78* (2013.01);
(Continued)

(58) Field of Classification Search
CPC ...... E06B 2009/905; E06B 9/307; E06B 9/32; E06B 9/322; E06B 2009/285; E06B 9/76;
(Continued)

(56) References Cited

U.S. PATENT DOCUMENTS 5,553,649 A * 9/1996 Chisaka .................. E06B 9/306
160/168.1 R
5,850,863 A * 12/1998 Huang .................... E06B 9/303
160/168.1 R
(Continued)

FOREIGN PATENT DOCUMENTS

JP   2002106268 A   4/2002
JP   2006241692 A   9/2006
(Continued)

OTHER PUBLICATIONS

English Translation of Abstract for JP 2008163578.
(Continued)

*Primary Examiner* — Katherine Mitchell
*Assistant Examiner* — Johnnie A Shablack
(74) *Attorney, Agent, or Firm* — Baker & McKenzie LLP

(57) ABSTRACT

A control module of a window shade includes a drive axle affixed with a sleeve, an arrester assembled around the sleeve, a cord drum connected with an operating cord, a clutch operable to couple and decouple the cord drum with respect to the drive axle, and a release unit including a stick that is operatively connected with the arrester. The arrester blocks rotation of the drive axle in a locking state, and has an unlocking state allowing rotation of the drive axle. The operating cord is pulled to drive the cord drum in rotation and turn the clutch to a coupling state, such that the rotation of the cord drum is transmitted through the clutch to drive the drive axle in rotation for raising the shading structure. Moreover, the stick is operable to switch the arrester from to the unlocking state for lowering the shading structure by gravity action.

20 Claims, 34 Drawing Sheets

(51) Int. Cl.
  *F16H 19/00*   (2006.01)
  *E06B 9/32*   (2006.01)
  *E06B 9/78*   (2006.01)
  *E06B 9/262*   (2006.01)
  *E06B 9/30*   (2006.01)
  *E06B 9/90*   (2006.01)

(52) U.S. Cl.
  CPC .............. *F16H 19/001* (2013.01); *E06B 9/30* (2013.01); *E06B 9/90* (2013.01); *E06B 2009/2625* (2013.01); *E06B 2009/2627* (2013.01); *E06B 2009/3222* (2013.01); *F16H 2019/008* (2013.01)

(58) Field of Classification Search
  CPC ..... E06B 9/78; E06B 9/30; E06B 9/90; F16H 19/06
  USPC ... 160/84.05, 176 R, 177 R, 168.1 R, 173 R, 160/340, 309, 319, 320
  See application file for complete search history.

(56) References Cited

U.S. PATENT DOCUMENTS

| | | | | |
|---|---|---|---|---|
| 5,904,198 A * | 5/1999 | Huang | ................... | E06B 9/303 160/168.1 R |
| 6,142,211 A * | 11/2000 | Judkins | ................... | E06B 9/262 160/308 |
| 6,196,293 B1 * | 3/2001 | Lee | ................... | E06B 9/303 160/168.1 V |
| 6,752,194 B1 * | 6/2004 | Huang | ................... | E06B 9/307 160/168.1 R |
| 6,786,270 B2 * | 9/2004 | Wen | ................... | E06B 9/322 160/170 |
| 6,973,952 B2 * | 12/2005 | Nien | ................... | E06B 9/90 160/170 |
| 7,624,785 B2 | 12/2009 | Yu et al. | | |
| 7,665,507 B2 * | 2/2010 | Naoki | ................... | E06B 9/42 160/170 |
| 8,342,309 B2 * | 1/2013 | Takagi | ................... | E06B 9/322 160/298 |
| 8,356,653 B2 * | 1/2013 | Fu-Lai | ................... | E06B 9/322 160/170 |
| 8,746,320 B2 * | 6/2014 | Yu | ................... | E06B 9/322 160/170 |
| 8,844,605 B2 * | 9/2014 | Ng | ................... | E06B 9/42 160/170 |
| 8,851,143 B2 * | 10/2014 | Zhu | ................... | E06B 9/38 160/121.1 |
| 9,062,492 B2 * | 6/2015 | Yu | ................... | E06B 9/322 |
| 9,187,951 B2 * | 11/2015 | Yu | ................... | E06B 9/322 |
| 9,284,774 B2 * | 3/2016 | Yu | ................... | E06B 9/38 |
| 2003/0221799 A1 * | 12/2003 | Cross | ................... | E06B 9/322 160/168.1 P |
| 2008/0041540 A1 | 2/2008 | Li | | |
| 2013/0220561 A1 * | 8/2013 | Yu | ................... | E06B 9/322 160/340 |
| 2013/0340951 A1 * | 12/2013 | Yu | ................... | E06B 9/322 160/168.1 P |
| 2014/0290876 A1 * | 10/2014 | Chen | ................... | E06B 9/307 160/170 |
| 2015/0007946 A1 * | 1/2015 | Yu | ................... | E06B 9/38 160/84.02 |
| 2016/0017964 A1 * | 1/2016 | Yu | ................... | E06B 9/32 160/168.1 P |

FOREIGN PATENT DOCUMENTS

| | | |
|---|---|---|
| JP | 2008163578 A | 7/2008 |
| TW | 525703 | 7/1991 |
| TW | 549349 U | 12/1991 |
| TW | I347395 | 12/1996 |
| TW | M421978 U | 2/2012 |

OTHER PUBLICATIONS

English Translation of Abstract for JP 2002106268.
The Office Action issued on Dec. 30, 2016 in co-pending CN Patent Application No. 201510970705.0 (and its cited references).

\* cited by examiner

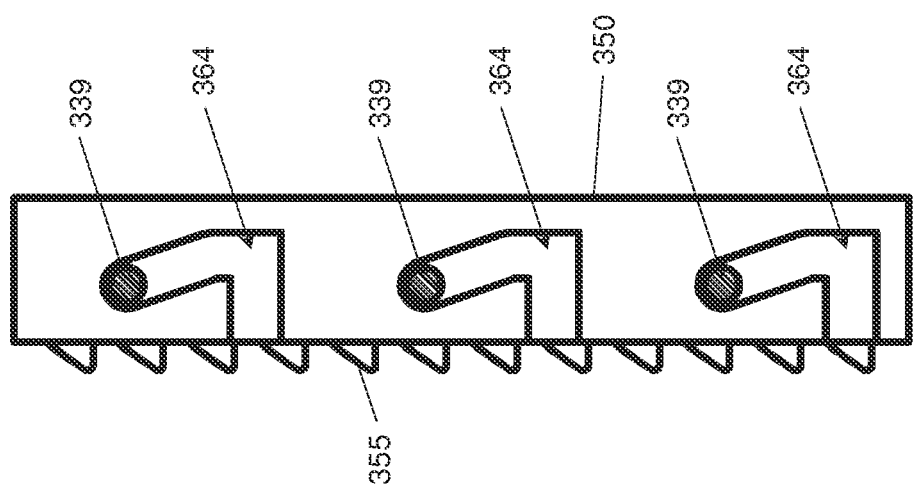

WINDOW SHADE AND ITS CONTROL MODULE

CROSS-REFERENCE TO RELATED APPLICATION(S)

This patent application is a continuation of U.S. patent application Ser. No. 13/484,530 filed on May 31, 2012, which claims priority to Taiwan Application No. 101106084 filed on Feb. 23, 2012, the disclosure of which are incorporated herein by reference.

BACKGROUND

1. Field of the Invention

The present inventions relate to window shades, and control modules used for actuating window shades.

2. Description of the Related Art

Many types of window shades are currently available on the market, such as Venetian blinds, roller shades and honeycomb shades. The shade when lowered can cover the area of the window frame, which can reduce the amount of light entering the room through the window and provided increased privacy. Conventionally, the window shade is provided with an operating cord that can be actuated to raise or lower the window shade. In particular, the operating cord may be pulled downward to raise the window shade, and released to lower the window shade.

In a conventional construction of the window shade, the operating cord can be connected with a drive axle. When the operating cord is pulled downward, the drive axle can rotate to wind suspension cords for raising the window shade. When the operating cord is released, the drive axle can be driven to rotate in a reverse direction for lowering the window shade.

However, this conventional construction may require to use an increased length of the operating cord for window shades that have greater vertical lengths. The greater length of the operating cord may affect the outer appearance of the window shade. Moreover, there is the risk of child strangle on the longer operating cord. To reduce the risk of accidental injuries, the operating cord may be maintained at a higher position so that a young child cannot easily reach the operating cord. Unfortunately, when the operating cord is pulled downward to raise the window shade, the operating cord may still move to a lower position and become accessible for a child.

With respect to a regular user, the manipulation of longer operating cords may also be less convenient. For example, the longer operating cord may become entangled, which may render its operation difficult.

Therefore, there is a need for a window shade that is convenient to operate, safer in use and address at least the foregoing issues.

SUMMARY

The present application describes a window shade and a control module suitable for use with the window shade. The construction of the control module can use a shorter length of an operating cord for raising a shading structure of the window shade. The control module also includes an actuator that is easily operable to turn the control module from a locking state to an unlocking state for lowering a bottom part of the window shade.

In one embodiment, the control module includes a drive axle affixed with a sleeve, an arrester assembled around the sleeve, a release unit, a cord drum and an operating cord connected with each other, and a clutch. The arrester has a locking state in which the arrester blocks rotation of the sleeve and the drive axle to keep a shading structure of the window shade at a desired position, and an unlocking state in which rotation of the sleeve and the drive axle is allowed for vertical adjustment of the shading structure. The release unit includes an actuator that is operatively connected with the arrester, the actuator including a stick having an elongated shape extending substantially vertical along a lengthwise axis. The clutch is operatively connected with the cord drum, and is operable to couple and decouple the cord drum with respect to the drive axle. The operating cord is pulled to drive the cord drum in rotation and turn the clutch to a coupling state, such that the rotation of the cord drum is transmitted through the clutch in the coupling state to drive the sleeve and the drive axle in rotation for switching the arrester to the unlocking state and raising the shading structure, and the stick is rotatable about the lengthwise axis to switch the arrester from the locking state to the unlocking state for lowering the shading structure by gravity action.

According to another embodiment, the control module includes a drive axle affixed with a sleeve, a spring assembled around the sleeve, a release unit, a cord drum and an operating cord connected with each other, and a clutch operatively connected with the cord drum. The spring has a locking state in which the spring blocks a rotational displacement of the sleeve and the drive axle to keep a shading structure of a window shade at a desired position, and an unlocking state in which rotation of the sleeve and the drive axle is allowed for vertical adjustment of the shading structure. The release unit includes a collar, a stick having an elongated shape, and a plurality of transmission members operatively connected with the collar and the stick, the collar being rotatable about a rotation axis of the drive axle and affixed with an end of the spring, and the collar being in gear engagement with one of the transmission members. The clutch is operatively connected with the cord drum, and is operable to couple and decouple the cord drum with respect to the drive axle. The operating cord is pulled to drive the cord drum in rotation and turn the clutch to a coupling state, such that the rotation of the cord drum is transmitted through the clutch in the coupling state to drive the sleeve and the drive axle in rotation for switching the spring to the unlocking state and raising the shading structure, and the stick is operable to cause the collar to rotate for switching the spring from the locking state to the unlocking state so that the shading structure is allowed to lower by gravity action.

At least one advantage of the window shades described herein is the ability to conveniently adjust the shade by respectively operating the operating cord and the actuator. The operating cord used for raising the window shade has a shorter length, which can reduce the risk of child strangle. The window shade can also be easily lowered by rotating the actuator.

BRIEF DESCRIPTION OF THE DRAWINGS

FIG. 34 is a schematic view illustrating a portion of the clutch in the control module shown in FIG. 33.

DETAILED DESCRIPTION OF THE EMBODIMENTS

Figure 1:
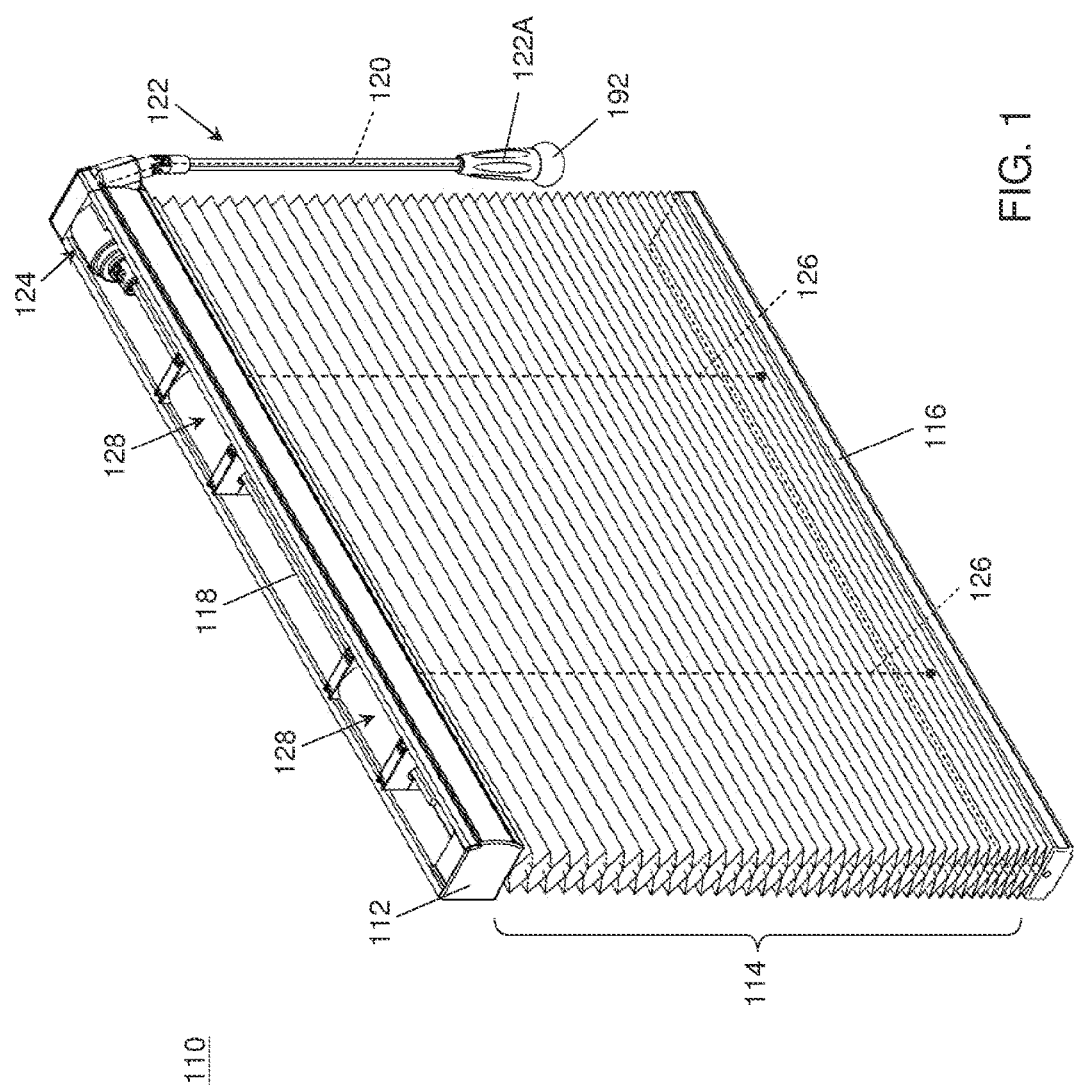
FIG. 1 is a perspective view illustrating an embodiment of a window shade having a control module.

FIG. 1 is a perspective view illustrating an embodiment of a window shade 110. The window shade 110 can include a head rail 112, a shading structure 114, and a bottom part 116 disposed at the bottom of the shading structure 114. For operatively actuating the shading structure 114 and the bottom part 116, the window shade 110 can include a control module 124, a plurality of suspension cords 126 (shown with phantom lines), and a plurality of cord winding units 128. The control module 124 can include a drive axle 118, an operating cord 120 (shown with phantom line) and an actuator 122. Each suspension cord 126 can be assembled between the head rail 112 and the bottom part 116, a first end portion of the suspension cord 126 being connected with a rotary drum of one associated winding unit 128, and a second end portion of the suspension cord 126 being connected with the bottom part 116. The shading structure 114 can be gathered upward by raising the bottom part 116 toward the head rail 112. For raising the bottom part 116, the operating cord 120 can be pulled in movement, which can be transmitted and converted through the control module 124 into a rotation of the drive axle 118 and the rotary drum (not shown) of each cord winding unit 128, which in turn winds the length of the corresponding suspension cord 126 between the head rail 112 and the bottom part 116.

By operating the actuator 122, the control module 124 can also be turned to an unlocking or release state in which the drive axle 118 can be allowed to rotate. When the control module 124 is in this release state, the bottom part 116 can self lower by gravity action, which causes the suspension cords 126 to unwind from their respective cord winding units 128 and expands the shading structure 114. The window shade 110 can thereby be turned to a closing or shading state. Exemplary constructions and operations of the control module 124 will be described hereafter with reference to additional drawings.

Various constructions may be applicable to make the shading structure 114. For example, the shading structure 114 may include a honeycomb structure made from a cloth material, a Venetian blind construction, or a plurality of rails or slats extending vertically and parallel to one another.

The head rail 112 may be of any types and shapes. The head rail 112 may be disposed at a top of the window shade 110 and configured to mount the drive axle 118 and the control module 124. The bottom part 116 is disposed at a bottom of the window shade 110. In one embodiment, the bottom part 116 may be formed as an elongated rail. However, any types of weighing structures may be suitable. In some embodiment, the bottom part 116 may also be formed by a lowermost portion of the shading structure 114.

The drive axle 118 can define a drive axis, and can be respectively connected with the cord winding units 128 and the control module 124. The displacement of the bottom part 116 is operatively connected with the actuation of the drive axle 118, i.e., the rotation of the drive axle 118 is operatively connected with the up and down movements of the bottom part 116. In one embodiment, the rotary drum of each cord winding unit 128 can be affixed with the drive axle 118, so that the cord winding units 128 can rotate synchronously along with the drive axle 118 to wind and unwind the suspension cords 126. It is worth noting that the cord winding units 128 may be made from any suitable or conventional constructions. Moreover, the drive axle 118 is also operatively connected with the control module 124, such that the drive axle 118 can be driven in rotation via actuation of the operating cord 120 to raise the shading structure 114.

The construction of the window shade 110 can be such that a user can pull on the operating cord 120 to raise the shading structure 114. In one embodiment, the operating cord 120 can have a length that is shorter than a permitted total course of the bottom part 116. The user can repeatedly apply a sequence of pulling and release actions on the operating cord 120 to progressively raise the shading structure 114. For example, the overall length of the operating cord 120 can be smaller than half the height of the totally expanded shading structure 114. In another example, the length of the operating cord 120 can be one third of the height of the totally expanded shading structure 114, and the operating cord 120 can be repeatedly pulled about three times to entirely raise the shading structure 114. This process is similar to a ratcheting technique allowing the user to pull the operating cord 120 to raise the shading structure 114 a certain amount, allow the operating cord 120 to retract, and then pull the operating cord 120 again to continue to raise the shading structure 114. This process may be repeated until the shading structure 114 reaches a desired height.

Moreover, the actuator 122 can be operatively rotated to turn the control module 124 from a locking state to a release state to allow rotation of the drive axle 118, such that the bottom part 116 can lower by action of its own weight. When the actuator 122 is released, the control module 124 can turn from the release state to the locking state to block rotation of the drive axle 118.

Figure 2:
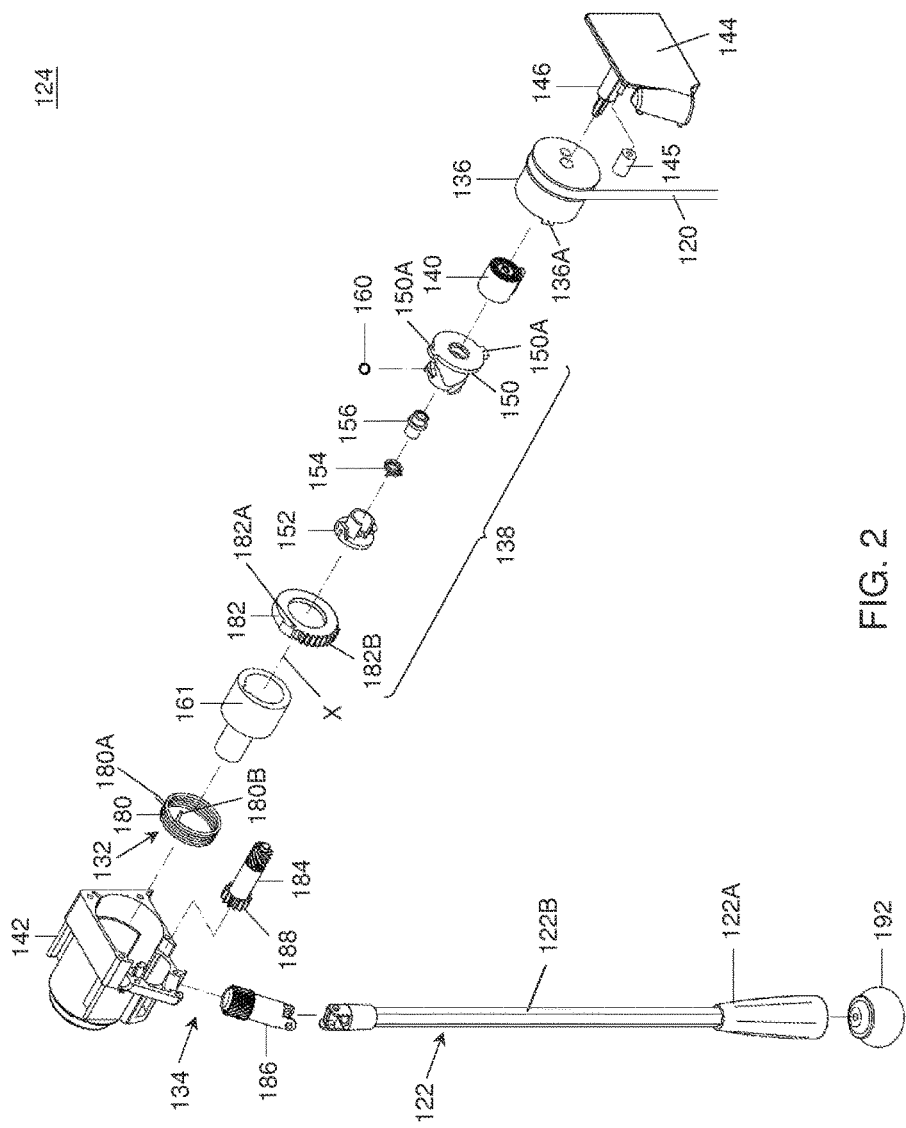
FIG. 2 is an exploded view illustrating the control module.
Figure 3:
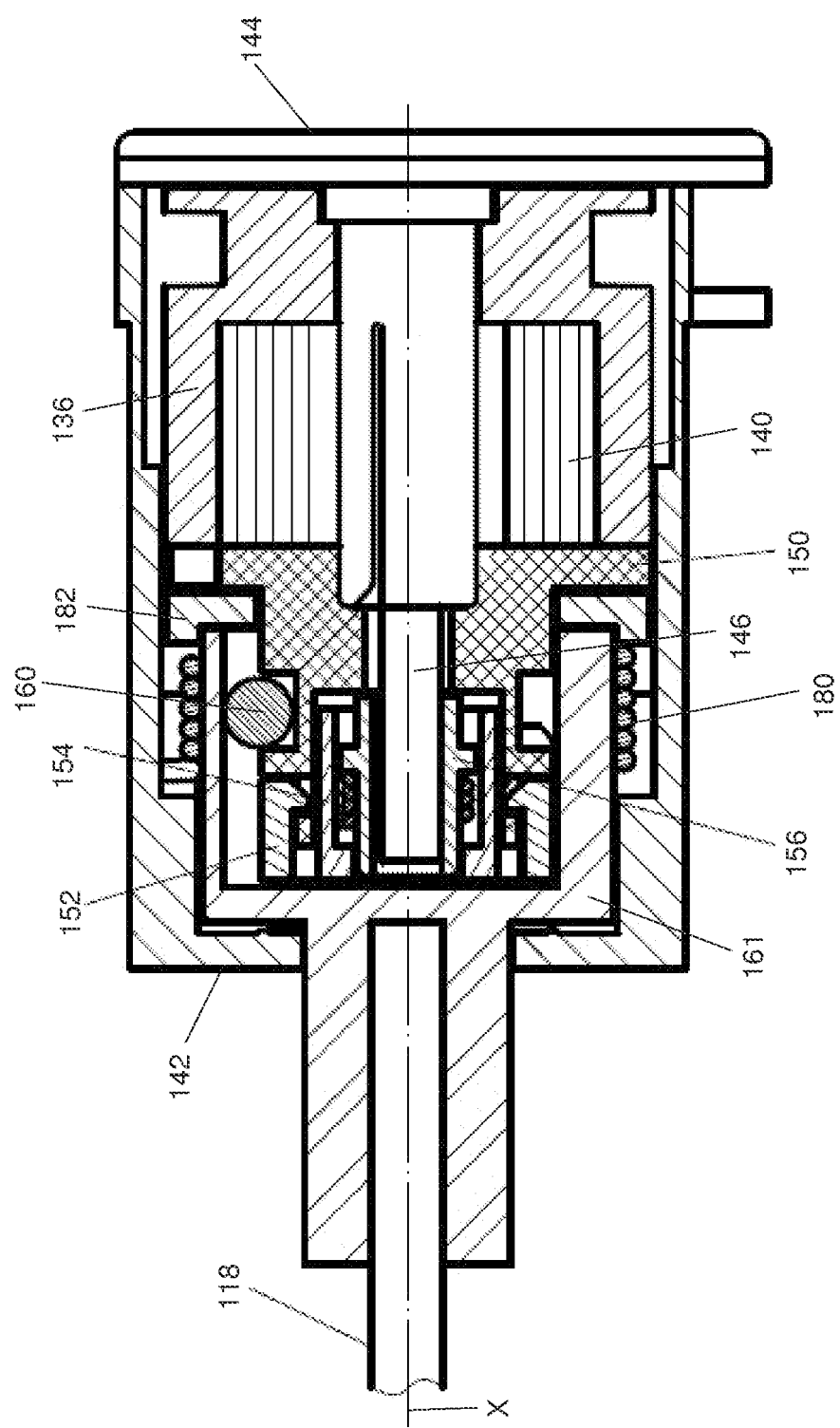
FIG. 3 is a cross-sectional view illustrating the control module.

FIGS. 2 and 3 are respectively exploded and cross-sectional views illustrating an embodiment of the control module 124. The control module 124 can include an arrester 132, a release unit 134, a cord drum 136 and a clutch 138. The control module 124 can further include a spring 140 operable to drive rotation of the cord drum 136 in a direction for winding the operating cord 120. The spring 140 can be disposed inside (as shown) or outside the control module 124.

In addition, the control module 124 can include a housing 142 and a cover 144. The housing 142 and the cover 144 can be assembled together to form an enclosure in which the component parts of the control module 124 can be assembled. The cover 144 can have an inner side provided with a guide wheel 145 about which the operating cord 120 can be in contact and guided in movement.

The clutch 138 can be operable to couple and decouple the movements of the cord drum 136 and drive axle 118. When the clutch 138 is in the decoupling state, the drive axle 118 and the cord drum 136 can rotate relative to each other. For example, the cord drum 136 can remain stationary, and the weight of the bottom part 116 and shading structure 114 stacked thereon can drive the drive axle 118 in rotation relative to the cord drum 136, which causes the shading structure 114 and the bottom part 116 to lower. Alternatively, the drive axle 118 can remain stationary, and the cord drum 136 can rotate to wind and take up the operating cord 120. By pulling on the operating cord 120, the clutch 138 can be turned to the coupling state. In the coupling state of the clutch 138, the cord drum 136 and the drive axle 118 can rotate synchronously via movement transmission through the clutch 138 to raise the shading structure 114 and the bottom part 116.

The clutch 138 can be assembled about a fixed shaft 146 between the arrester 132 and the cord drum 136. In one embodiment, the clutch 138 can include a first coupling 150, a second coupling 152, a spring 154, a connection member 156 and a rolling part 160. The rolling part 160 can be exemplary a ball. The clutch 138 can further include a sleeve 161.

Figure 4:
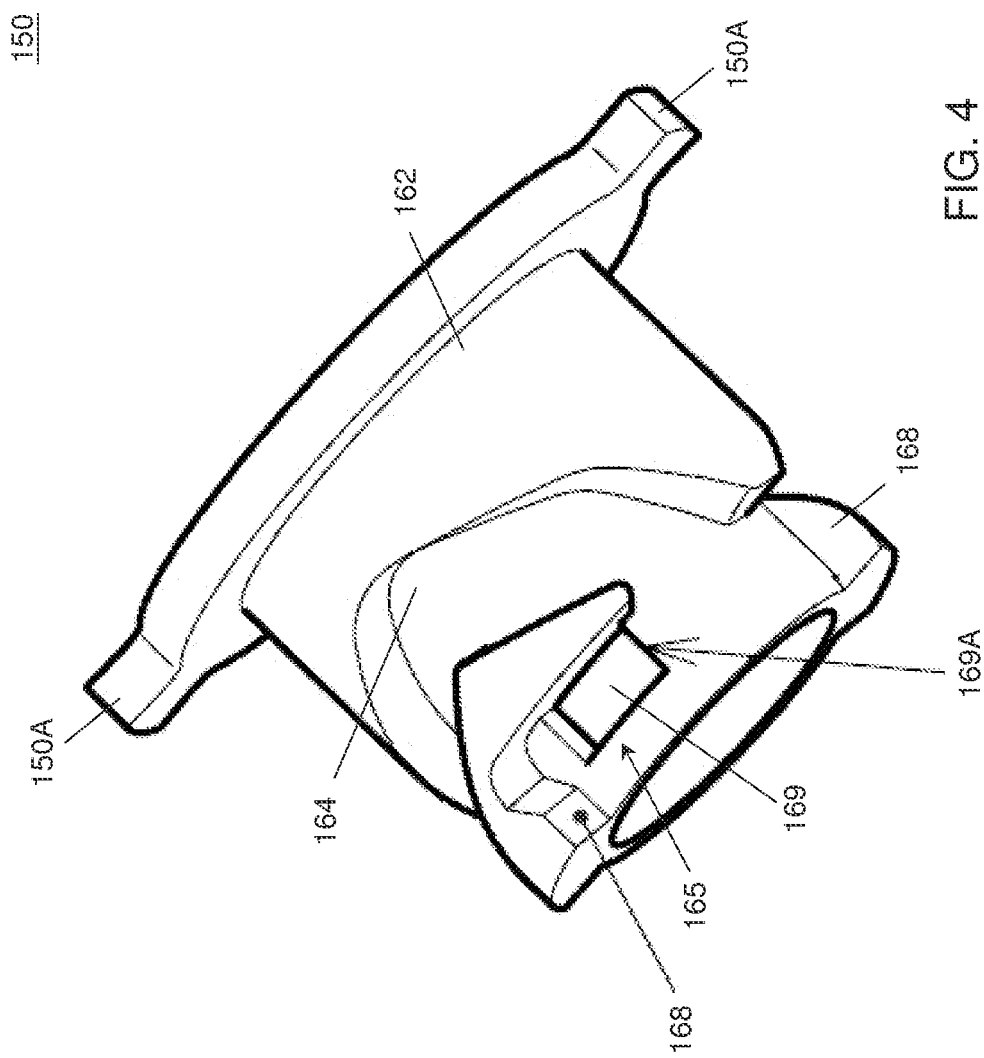
FIG. 4 is a perspective view illustrating a first coupling of a clutch included in the control module.
Figure 5:
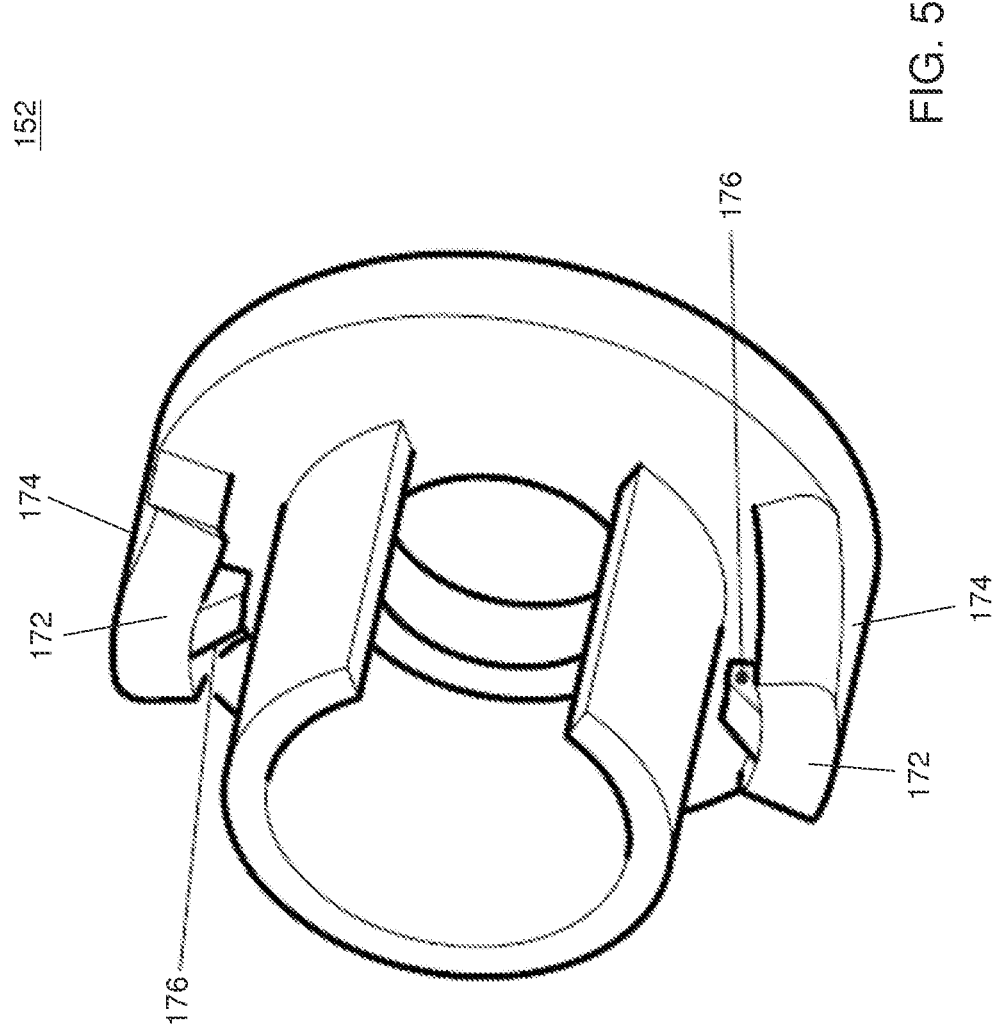
FIG. 5 is a perspective view illustrating a second coupling of a clutch included in the control module.
Figure 6:
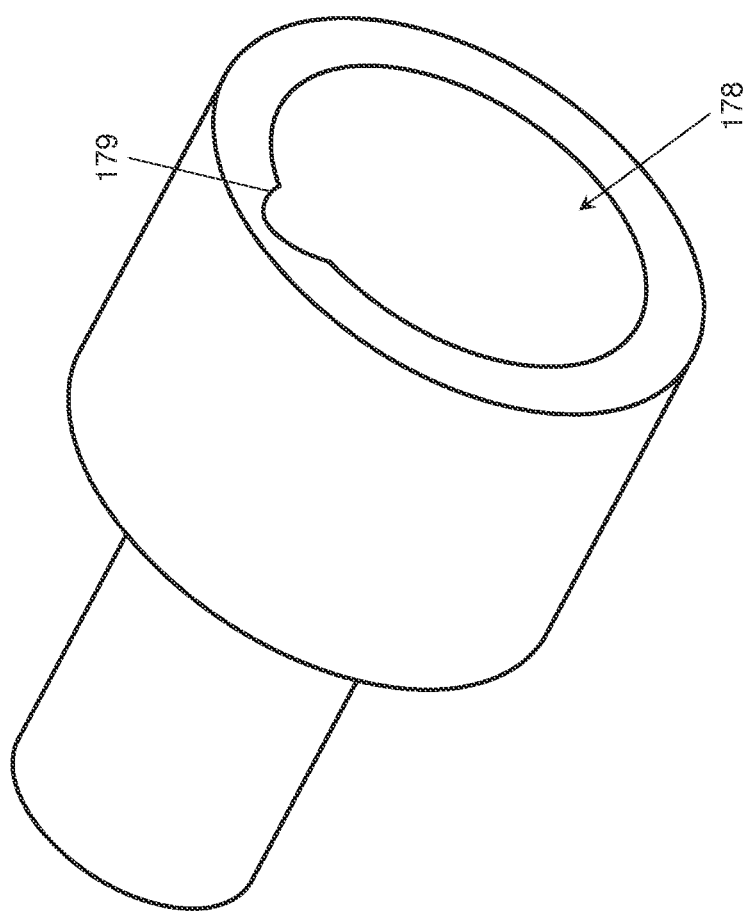
FIG. 6 is a perspective view illustrating a sleeve affixed with a drive axle in the control module.
Figure 7:
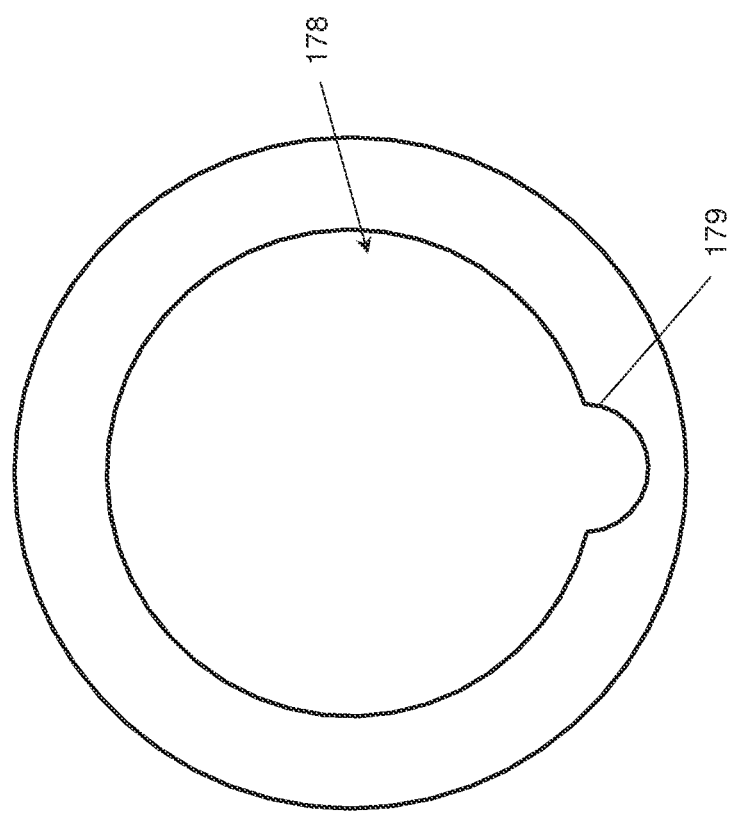
FIG. 7 is a front view of the sleeve shown in FIG. 6.

Referring to FIGS. 3-5, the connection member 156 can be affixed with the fixed shaft 146. The fixed shaft 146 can be spaced apart from the drive axle 118. More specifically, the fixed shaft 146 can extend from the cover 144 coaxial to the drive axle 118. The first coupling 150 can be pivotally connected with a portion of the fixed shaft 146, and the second coupling 152 can be pivotally connected with the connection member 156. The first and second couplings 150 and 152 can rotate about the common axis of the drive axle 118 and fixed shaft 146 relative to the fixed shaft 146 to turn the clutch 138 to the coupling or decoupling state.

Referring to FIG. 4, the first coupling 150 can have a generally cylindrical shape, and mate with the second coupling 152. More particularly, the first coupling 150 can have an outer surface 162 of a cylindrical shape defined between two end portions. The outer surface 162 can include a recessed region that extends along the periphery of the first coupling 150 and at least partially defines a guide track 164 of the clutch 138 and one or more notch 165 communicating with the guide track 164. In one embodiment, two notches 165 may be provided diametrically opposite. The first coupling 150 can have a first end portion near the cord drum 136 provided with two opposite radial flanges 150A. The cord drum 136 can contact with the radial flanges 150A, such that rotation of the cord drum 136 can drive the first coupling 150 to rotate.

The first coupling 150 can have a second end portion near the second coupling 152 provided with at least a radial abutment 168 that is located adjacent to the notch 165. In one embodiment, two radial abutments 168 can be provided at two opposite locations on the outer surface of the first coupling 150 respectively adjacent to the notches 165.

The first coupling 150 can further include at least a slot 169 spaced apart from the radial abutments 168. In one embodiment, two slots 169 can be provided at diametrically opposite locations of the first coupling 150 respectively adjacent to the radial abutments 168.

Referring to FIG. 5, the second coupling 152 can have a generally cylindrical shape, and can mate with the first coupling 150. The second coupling 152 can have two radial ribs 172 diametrically opposite to each other. Each radial rib 172 can have an outer surface 174 and an extension 176. The extension 176 can stretch radial from the radial rib 172 toward the center of the second coupling 152.

Figure 14:
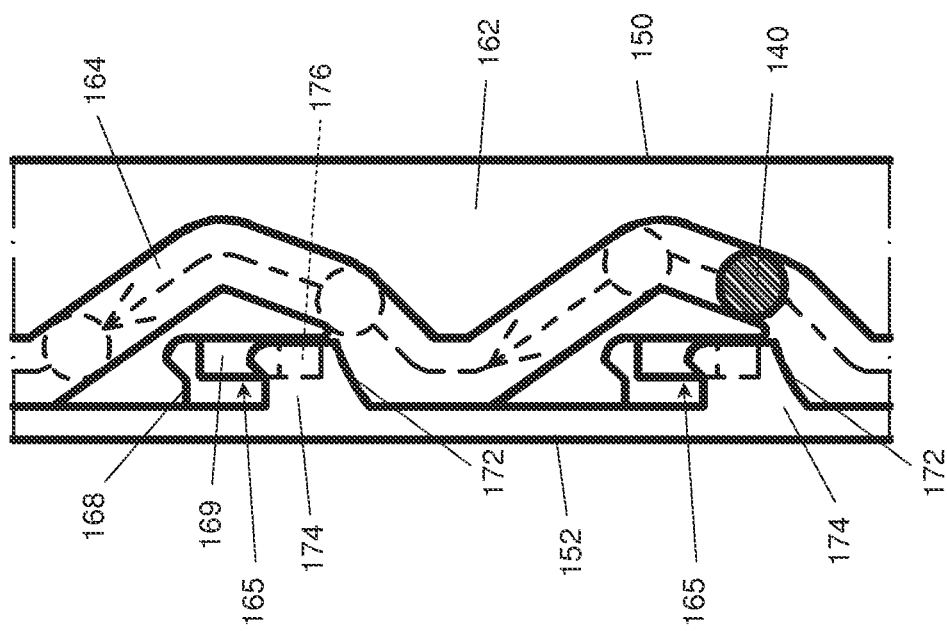
FIG. 14 is a schematic view illustrating a configuration of a guide track provided in the clutch when the window shade is lowered.

As shown in FIG. 14, after the first and second couplings 150 and 152 are assembled together, a closed guide track 164 can be formed between the outer surface 162 of the first coupling 150 and the outer surface 174 of the second coupling 152. The guide track 164 can peripherally run around the first and second couplings 150 and 152. Each radial rib 172 can be movably disposed adjacent to one corresponding notch 165 of the first coupling 150. The extension 176 can detachably insert into one corresponding slot 169 to guide relative movement between the first and second couplings 150 and 152. Accordingly, the radial ribs 172 can move respectively in the notches 165 to form or remove a plurality of stop regions 177 in the path of the guide track 164 (as better shown in FIGS. 18 and 19).

In conjunction with FIGS. 2 and 3, FIGS. 6 and 7 are schematic views illustrating sleeve 161. The sleeve 161 can be generally cylindrical in shape, and can be affixed with the drive axle 118, such that the sleeve 161 can rotate along with the drive axle 118. The sleeve 161 can include a central cavity 178 and a radial slot 179. The radial slot 179 can be formed in an inner sidewall of the central cavity 178, and can extend linearly parallel to the axis of the drive axle 118. When the clutch 138 is assembled, the first and second couplings 150 and 152 can be disposed in the central cavity 178, such that the guide track 164 can overlap at least partially with the length of the radial slot 179, and the rolling part 160 can be disposed in the guide track 164 and the radial slot 179.

When the clutch 138 is in the decoupling state, the relative positions of the first and second couplings 150 and 152 can be such that a rotation of the drive axle 118 and the sleeve 161 independent from the cord drum 136 can cause the rolling part 160 to move along the radial slot 179 and the guide track 164 relative to the couplings 150 and 152 and the sleeve 161.

Figure 18:
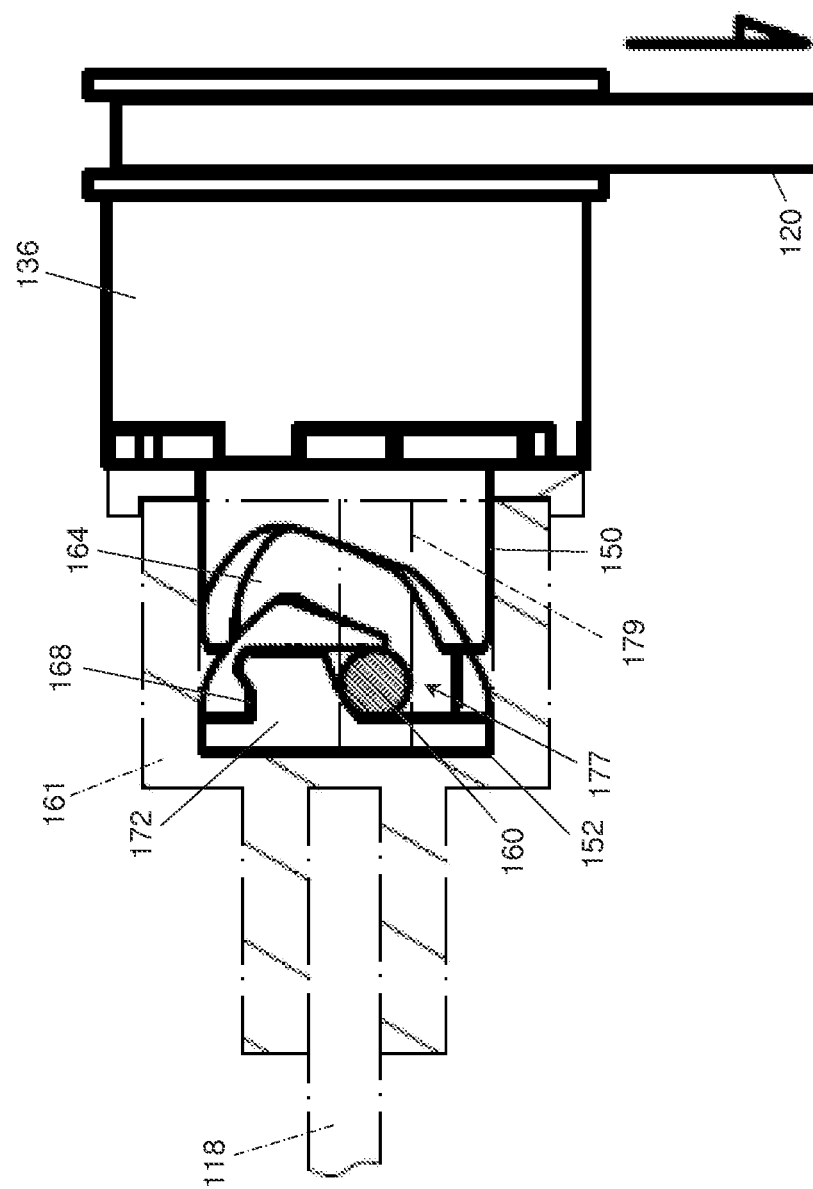
FIG. 18 is a schematic view illustrating a portion of the control module during raising of the window shade.
Figure 19:
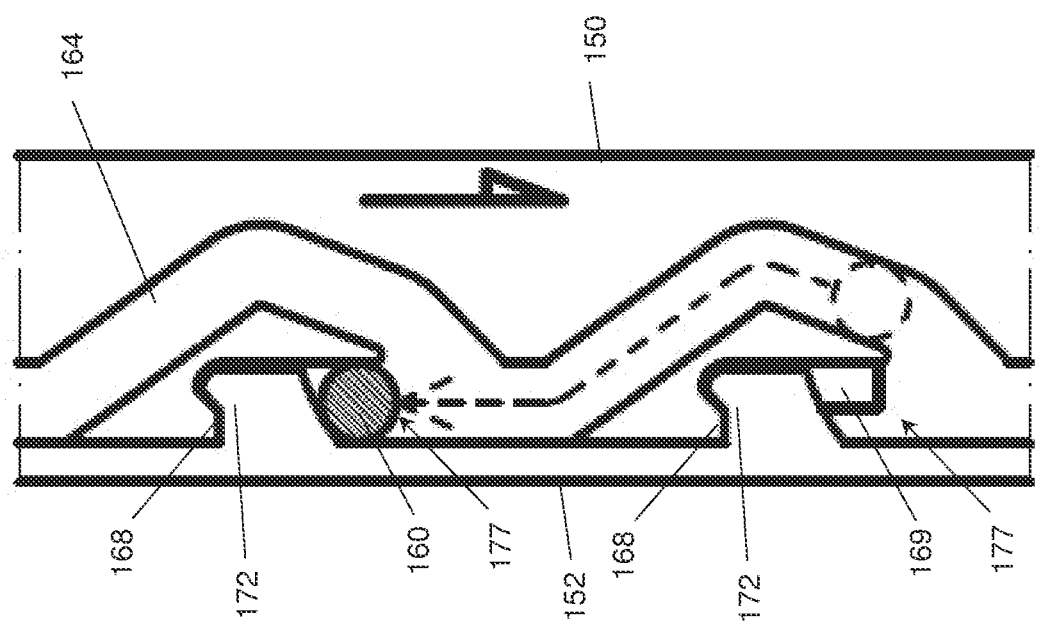
FIG. 19 is a schematic view illustrating a configuration of a guide track provided in the clutch when the window shade is raised.

When the clutch 138 is in the coupling state, the second coupling 152 can rotationally displace to a second position relative to the first coupling 150 so as to form the stop regions 177 of recessed shapes in the guide track 164. The stop regions 177 can be respectively formed as recesses at the areas of the notches 165, delimited by at least one sidewall of the guide track 164 (as shown in FIG. 18). Accordingly, the rolling part 160 can move along the guide track 164 and the radial slot 179, and then enter and stop in one stop region 177. As a result, the rotation of the cord drum 136 can be transferred via the first and second couplings 150 and 152 and through the restricted rolling part 160 to the sleeve 161 and the drive axle 118. In some variant embodiments, the clutch 138 can also directly transfer the rotation from the cord drum 136 to the drive axle 118.

Figure 8:
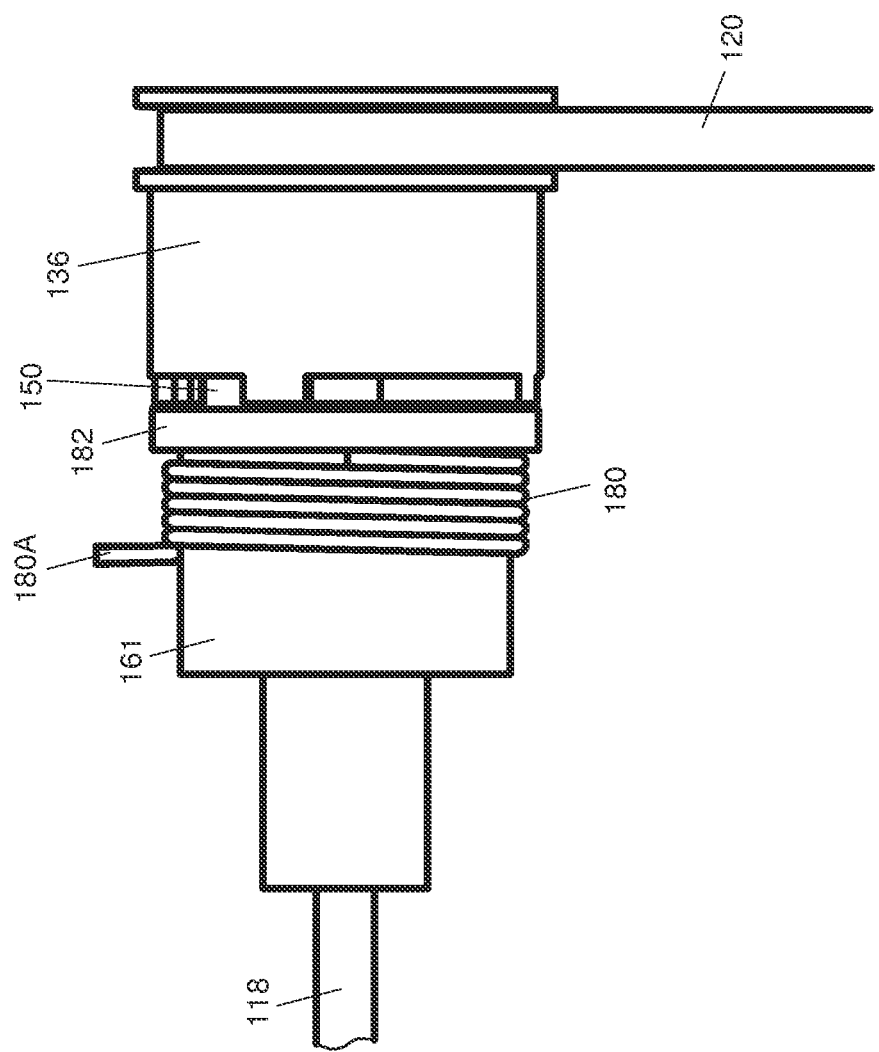
FIG. 8 is a side view illustrating an assembled portion of the control module.
Figure 9:
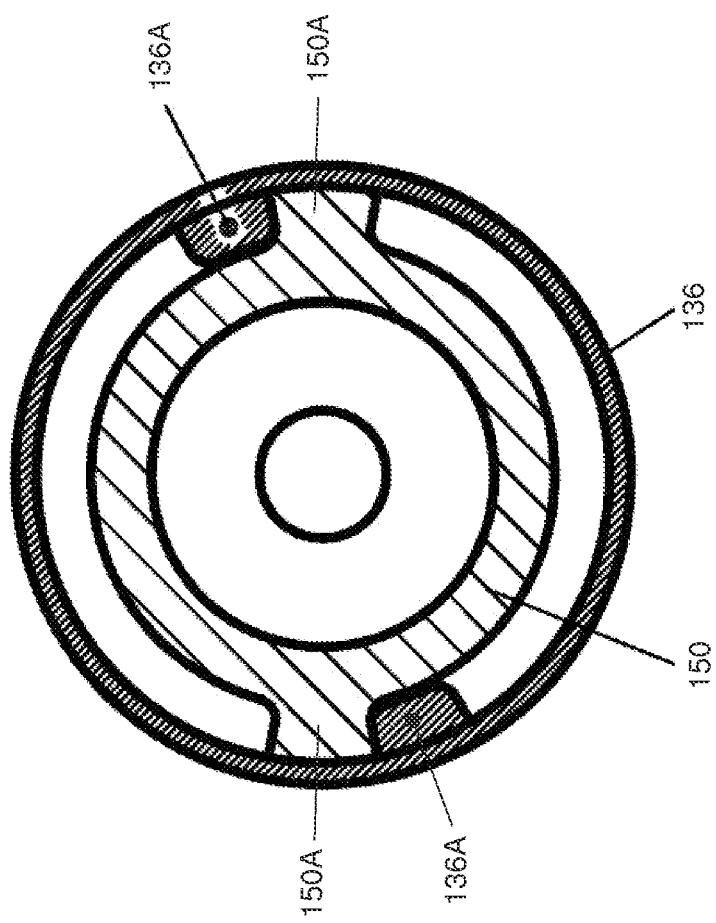
FIG. 9 is a side view illustrating a cord drum in the control module.

In conjunction with FIG. 2, FIGS. 8 and 9 are schematic views illustrating the assembly of a portion of the control module 124 (including the cord drum 136 and the sleeve 161). The cord drum 136 can have a generally cylindrical shape. The cord drum 136 can be pivotally connected with the fixed shaft 146, and can be disposed adjacent to a side of the first coupling 150 opposite to the second coupling 152. The cord drum 136 can be connected with the operating cord 120, such that a rotation of the cord drum 136 can wind the operating cord 120 thereon. An end portion of the cord drum 136 proximate to the first coupling 150 can have at least one radial flange 136A. The radial flange 136A can contact with the flange 150A of the first coupling 150 so as to drive rotation of the clutch 138.

Referring to FIGS. 2 and 3, the cord drum 136 can be coupled with the spring 140. The spring 140 can bias the cord drum 136 in rotation for winding the operating cord 120 around the cord drum 136. The spring 140 can be exemplary a torsion spring assembled in an inner cavity of the cord drum 136. The torsion spring can have a first end affixed with the fixed shaft 146, and a second end affixed with the cord drum 136. The cord drum 136 can be driven by the biasing action of the torsion spring to rotate relative to the fixed shaft 146 for winding the operating cord 120. In other embodiments, the spring 140 can be assembled outside the control module 124, and can be used to drive reverse rotation of the cord drum 136: in this case, while the spring 140 is spaced apart from the control module 124, it can still connected with the cord drum 136 for driving its rotation to wind the operating cord 120.

Figure 10:
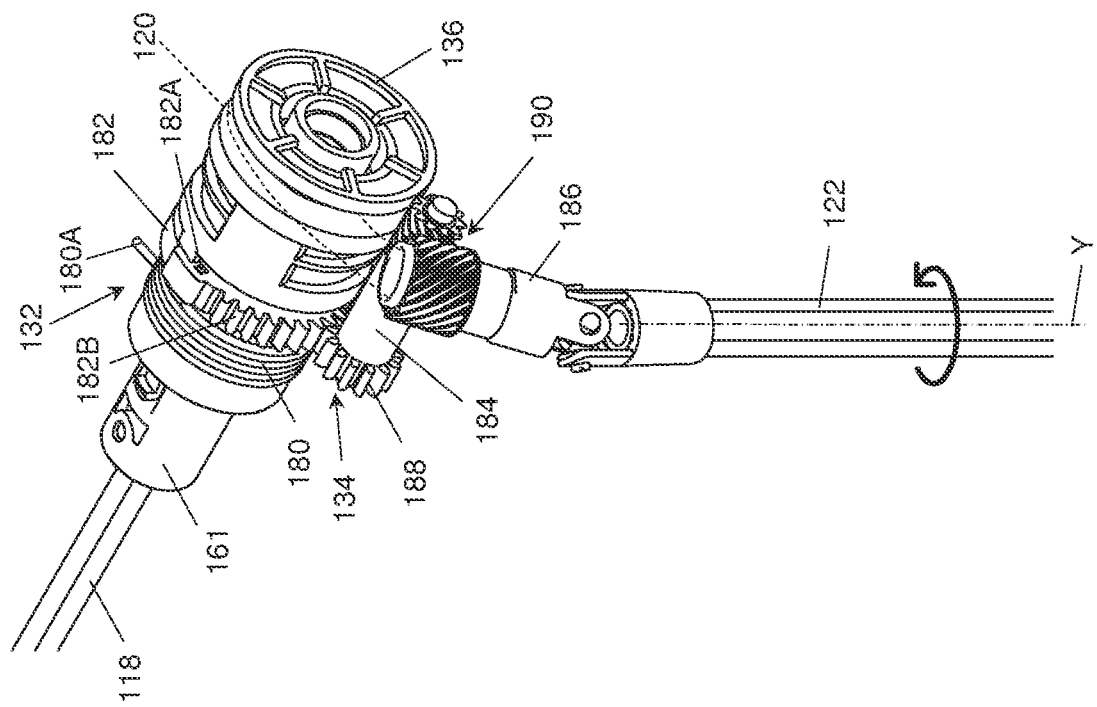
FIG. 10 is a perspective view illustrating the assembly of an arrester and release unit in the control module.
Figure 11:
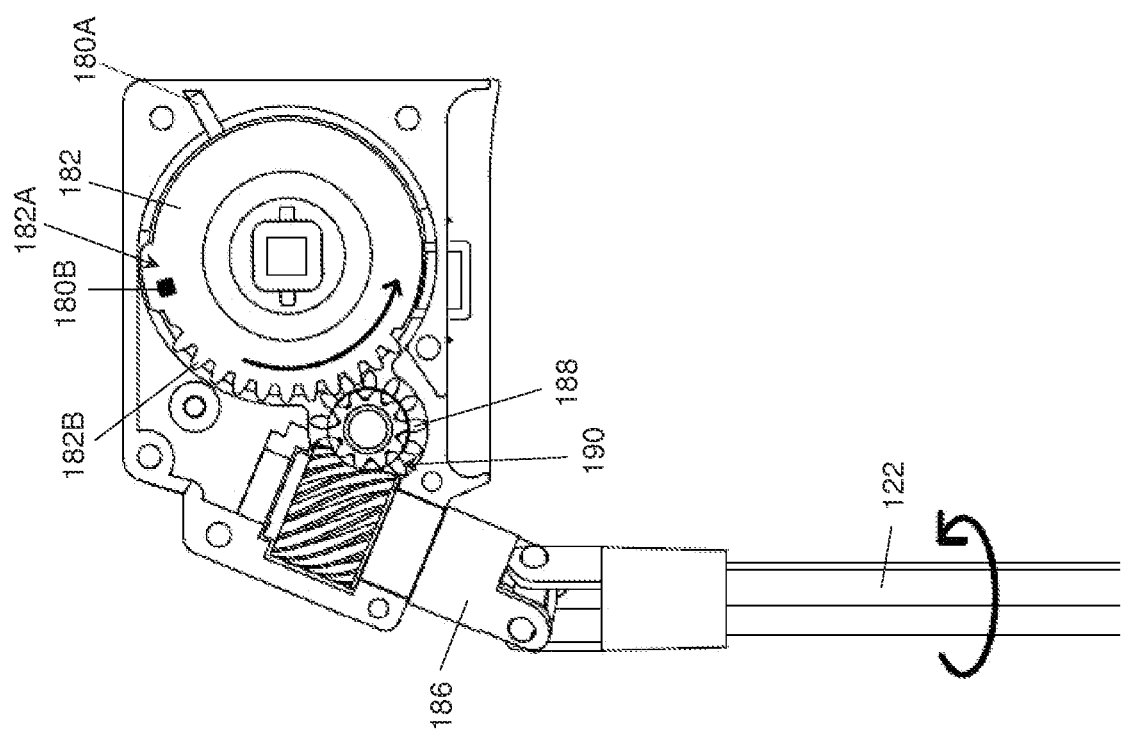
FIG. 11 is a side view illustrating the assembly of the arrester and release unit in the control module.

In conjunction with FIG. 2, FIGS. 10 and 11 are schematic views illustrating the assembly of the arrester 132 and the release unit 134. The arrester 132 can be assembled around the drive axle 118, and can rotate relative to the rotation axis X of the drive axle 118. The arrester 132 can have a locking state and an unlocking or release state. In the locking state, the arrester 132 can tighten on the sleeve 161 to lock the sleeve 161 and the drive axle 118 in position. Rotation of the sleeve 161 and drive axle 118 can be thereby blocked, and the shading structure 114 and the bottom part 116 can be held at a desired position. In the unlocking or release state, the arrester 132 can relax and allow rotation of the sleeve 161 and drive axle 118 so that the shading structure 114 and the bottom part 116 can lower by gravity action. In one embodiment, the arrester 132 can include a spring 180, e.g., a wrapping spring. The spring 180 can have a cylindrical shape, and can wrap on a peripheral surface of the sleeve 161. The spring 180 can include first and second prongs 180A and 180B extending radial outward. The first prong 180A can be affixed with the housing 142, and the second prong 180B can be affixed with a collar 182. The spring 180 can tighten on the sleeve 161 in the locking state, and loosen in the unlocking state.

The release unit 134 can be connected with the arrester 132, and can be operable to drive the arrester 132 to switch from the locking state to the unlocking state. In one embodiment, the release unit 134 can include a collar 182, transmission members 184 and 186 and the actuator 122. The collar 182 can have a circular shape. However, other shapes may be suitable, e.g., a semicircular shape, a curved shape, and the like. The collar 182 can be pivotally connected between the sleeve 161 and the cord drum 136, more particularly between the sleeve 161 and the first coupling 150. The collar 182 can rotate about the rotation axis X of the drive axle 118. The collar 182 can also be formed with a hole 182A and a toothed portion 182B. The second prong 180B of the spring 180 can pass through the hole 182A to affix with the collar 182.

The transmission members 184 and 186 are rotatable transmission parts that can have different and unparallel pivot axes, and can be assembled in a movement transmission chain between the collar 182 and the actuator 122. In one embodiment, the transmission members 184 and 186 can have spaced-apart pivot axes that are substantially perpendicular to each other. The pivot axis of the transmission member 184 can be substantially parallel to the axis of the drive axle 118, and the pivot axis of the transmission member 186 can be inclined relative to a vertical axis. The transmission member 184 can have a first portion provided with teeth 188 that can engage with the toothed portion 182B. A second portion of the transmission member 184 can engage with the transmission member 186 via a gear transmission 190. Examples of the gear transmission 190 can include a helicoid gear, a worm gear, and the like.

In one embodiment, the transmission member 186 can have a hollow body. The operating cord 120 can extend from the cord drum 136, travel through the transmission member 186, and be routed through an interior of the actuator 122. The operating cord 120 can move relative to the actuator 122, e.g., the operating cord 120 when pulled downward can slide along its hollow interior relative to the actuator 122.

Referring to FIGS. 1, 2 and 10, the actuator 122 can have an elongated shape that extends vertically downward from the head rail 112. For example, the actuator 122 can be formed from a wand or stick. The actuator 122 can be assembled at one side of the head rail 112, and can be operatively connected with the arrester 132 via the collar 182, and the transmission members 184 and 186. The operating cord 120 can extend along the interior of the actuator 122, and have a lower end provided with a plug 192. The plug 192 can abut against a lower end of the actuator 122 so as to prevent the operating cord 120 from completely separating from the actuator 122 when it moves upward. The actuator 122 can have an upper end pivotally connected with the transmission member 186 (e.g., through a transversal pivot shaft), so that the actuator 122 can rotate relative to the transmission member 186 for adjusting the inclination of the actuator 122. Moreover, the actuator 122 can rotate about its lengthwise axis Y to drive rotation of the transmission members 184 and 186, which in turn can drive the arrester 132 to switch from the locking state to the unlocking state.

When the operating cord 120 is not manipulated by a user, the spring 180 can tighten around the sleeve 161 to block rotation of the drive axle 118. The shading structure 114 can be thereby held at a fixed position by the locking action of the arrester 132. It is worth noting that the sleeve 161 can be formed as any part of any shape that is assembled with the drive axle 118 and can operatively connect with the clutch, and should not be limited to elements mounted with the drive axle. In other embodiments, the sleeve 161 can also be formed integral with the drive axle 118, and the spring 180 can tighten on the drive axle 118 to block its rotation.

Figure 12:
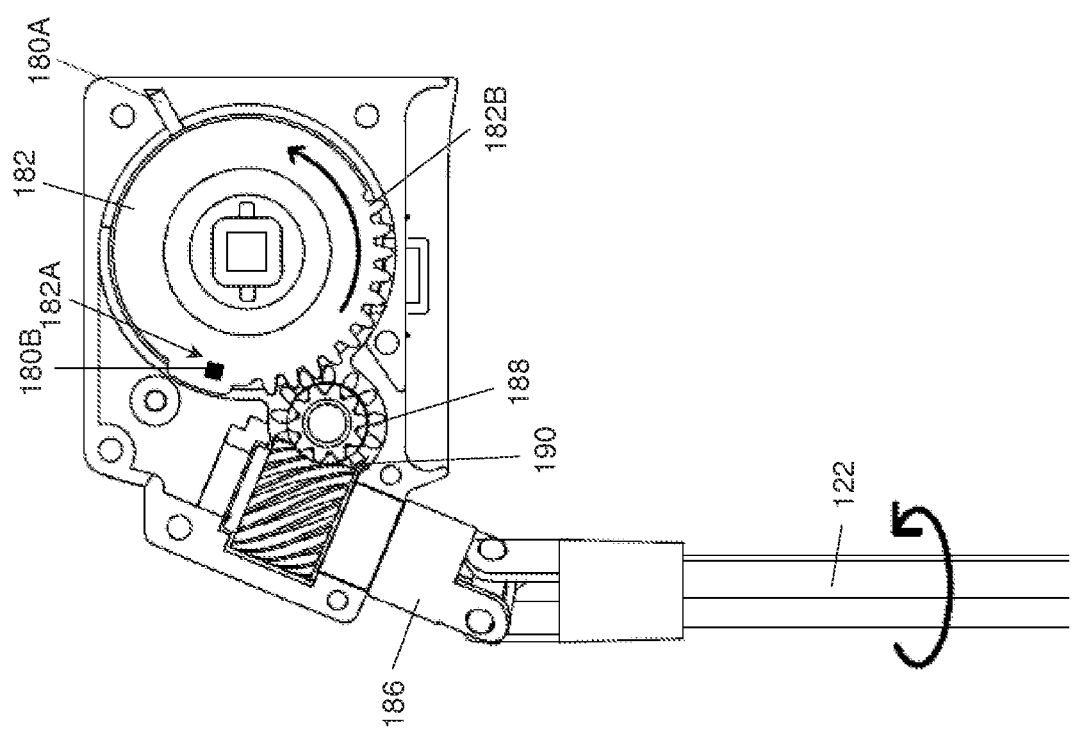
FIG. 12 is a schematic view illustrating an operation of the release unit.
Figure 13:
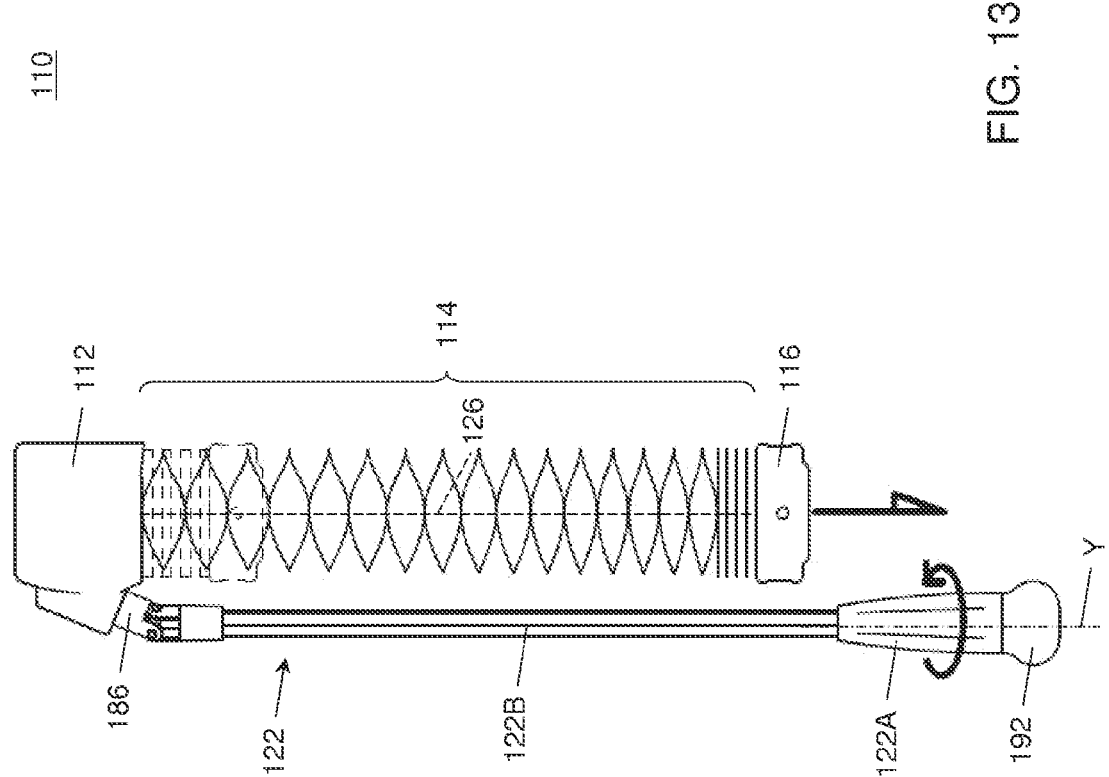
FIG. 13 is a schematic view illustrating an operation for lowering the window shade.

FIGS. 11 and 12 are schematic views illustrating the operation of the release unit 134. When a user wants to lower the bottom part 116, the actuator 122 can be gently rotated to drive a rotational displacement of the collar 182 about the rotation axis X of the drive axle 118 via the transmission members 184 and 186, which in turn causes a displacement of the second prong 180B for loosening the spring 180. The arrester 132 can thereby turn from the locking state to the unlocking state.

In conjunction with FIGS. 1-12, FIG. 13 is a schematic view illustrating an operation for lowering the window shade 110, and FIG. 14 is a schematic view illustrating a configuration of the guide track 164 in the clutch 138 while the window shade 110 is being lowered. Once the arrester 132 is switched to its unlocking state, the total weight of the bottom part 116 and the shading structure 114 stacked thereon can pull the suspension cords 126 to respectively unwind from the cord winding units 128, which can in turn cause the drive axle 118 to rotate relative to the cord drum 136. While the drive axle 118 and the sleeve 161 rotate for lowering the bottom part 116, the cord drum 136 can be kept stationary, and the rolling part 160 can roll and move along the radial slot 179 and the guide track 164 relative to the first and second couplings 150 and 152 and the sleeve 161, as shown by the arrow in FIG. 14. In particular, when the bottom part 116 is lowering, the spring 154 can produce frictional resistance to keep the first and second couplings 150 and 152 stationary, whereby the clutch 138 can be maintained in the decoupling state, i.e., no stop regions 177 are formed in the guide track 164. Moreover, when the clutch 138 is in the decoupling state, the radial rib 172 of the second coupling 152 is spaced apart from the radial abutment 168 which is located in one notch 165 of the first coupling 150.

When the bottom part 116 moving downward reaches a desired height, the actuator 122 can be released. As a result, the spring 180 can elastically recover its tightening state around the sleeve 161, which can cause the arrester 132 to turn to the locking state to block rotation of the drive axle 118 and the sleeve 161. Accordingly, the bottom part 116 can be locked at the desired height. While the spring 180 is recovering its tightening state, the collar 182 can also rotate in an opposite direction, which can drive the actuator 122 to reversely rotate to its initial position via the transmission members 184 and 186.

Figure 15:
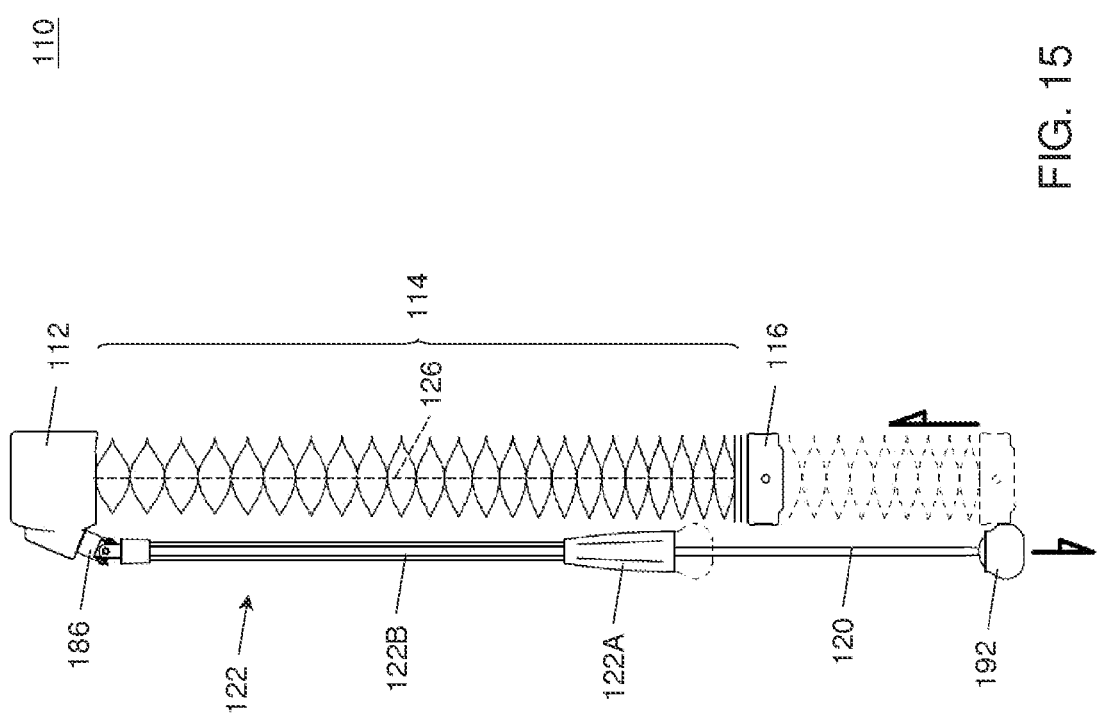
FIG. 15 is a schematic view illustrating an operating for raising the window shade.
Figure 16:
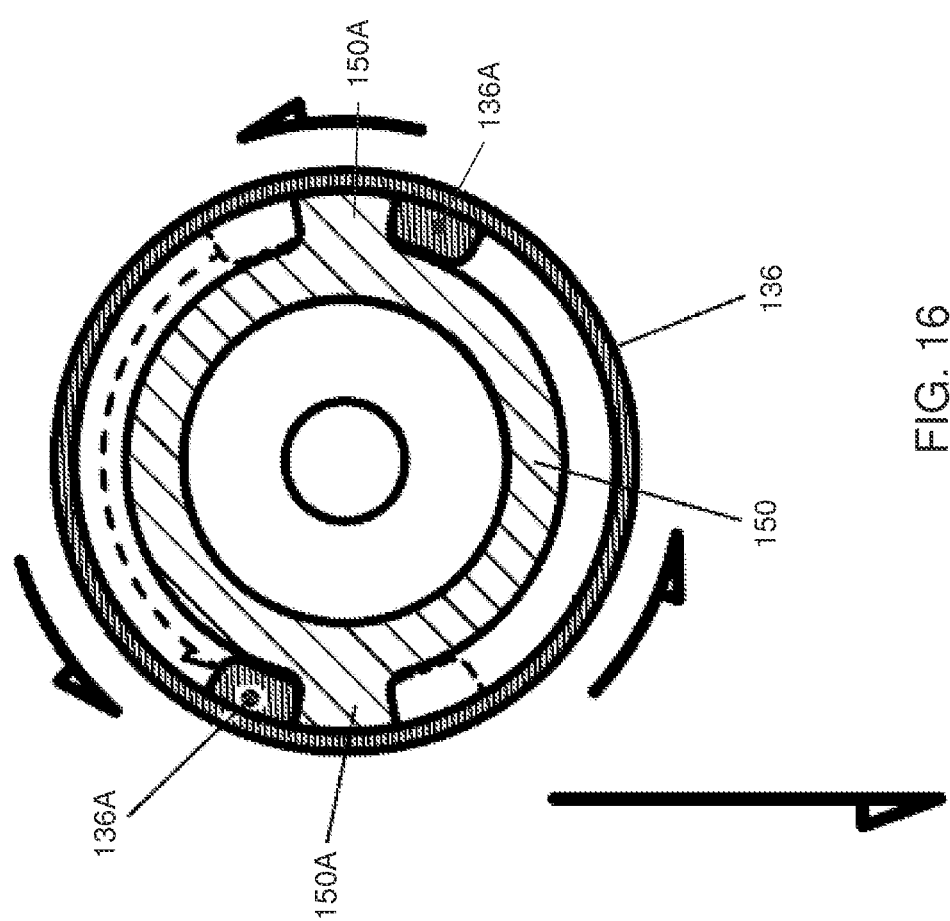
FIG. 16 is a partial cross-sectional view illustrating a configuration of a cord drum and first coupling in the control module when the window shade is raised.
Figure 17:
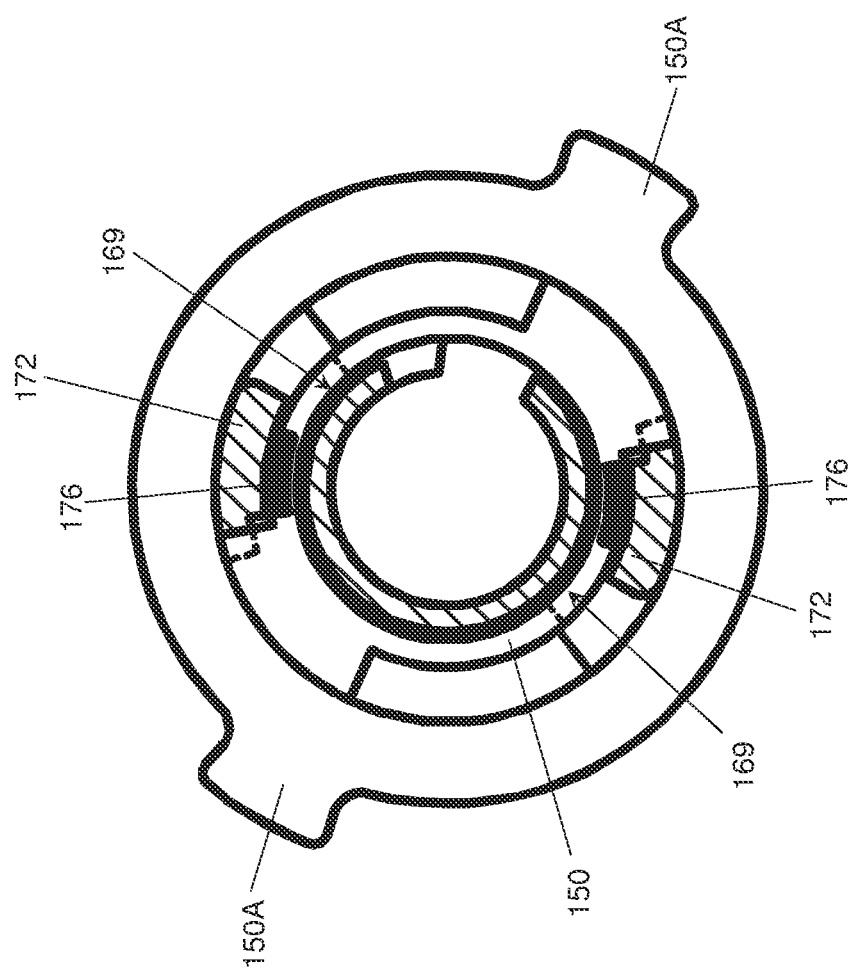
FIG. 17 is a partial cross-sectional view illustrating a configuration of a first and a second coupling in the control module when the window shade is raised.

FIGS. 15-19 are schematic views illustrating an operation for raising the window shade 110. Referring to FIG. 15, when a user wants to raise the bottom part 116, the operating cord 120 can be pulled downward, which causes the operating cord 120 to unwind from the cord drum 136 and travel through the interior of the actuator 122 which is kept generally stationary. As shown in FIG. 16, as the cord drum 136 rotates for unwinding the operating cord 120, the radial flange 136A of the cord drum 136 can push against one radial flange 150A of the first coupling 150. As a result, the first coupling 150 can rotate relative to the second coupling 152, until the radial abutment 168 of the first coupling 150 can contact with the radial rib 172 of the second coupling 152 (as better shown in FIG. 17). In this configuration, the second coupling 152 can be in a second position relative to the first coupling 150 where stop regions 177 are formed in the guide track 164 (as better shown in FIGS. 18 and 19).

As the operating cord 120 is continuously pulled downward, the cord drum 136 and the clutch 138 can rotate synchronously until the rolling part 160 reaches one stop region 177. It is worth noting that the illustrated embodiment can form two stop regions 177 in the guide track 164 so as to shorten the course of the rolling part 160 to the next stop region 177. However, alternate embodiments can also have the guide track 164 formed with a single stop region 177.

When the rolling part 160 reaches one stop region 177, the clutch 138 can be turned to the coupling state. Since the rolling part 160 concurrently engages with the stop region 177 and the radial slot 179 of the sleeve 161, further downward pulling of the operating cord 120 can drive the cord drum 136 in rotation. Owing to the contact between the radial flanges 136A and 150A, the rotation of the cord drum 136 can be transmitted to the clutch 138, which in turn can transmit the rotation to the sleeve 161 and the drive axle 118 via the engagement of the rolling part 160 with the radial slot 179 of the sleeve 161 and the stop region 177 of the clutch 138. As the sleeve 161 rotates, the first prong 180A of the spring 180 can abut against an inner surface of the housing 142, which can cause the spring 180 to switch from the state tightening on the sleeve 161 to the loosening state and have the arrester 132 turned to a release state. Accordingly, by pulling the operating cord 120 downward, the clutch 138 can be switched to the coupling state in which rotational displacement can be transmitted through the clutch 138 to drive the cord drum 136, the sleeve 161 and the drive axle 118 in synchronous rotation for raising the bottom part 116.

While the bottom part 116 is moving upward, the user can release the operating cord 120 at any time, e.g., when the bottom part 116 reaches a desired height or after the operating cord 120 has been entirely unwound from the cord drum 136. When the operating cord 120 is released, the spring 180 can recover its tightening state around the sleeve 161. The tightening action of the spring 180 can lock and block movement of the sleeve 161 and the drive axle 118, whereby the shading structure 114 can be held at the desired height. At the same time, the spring 140 can rotate to wind the operating cord 120.

Figure 20:
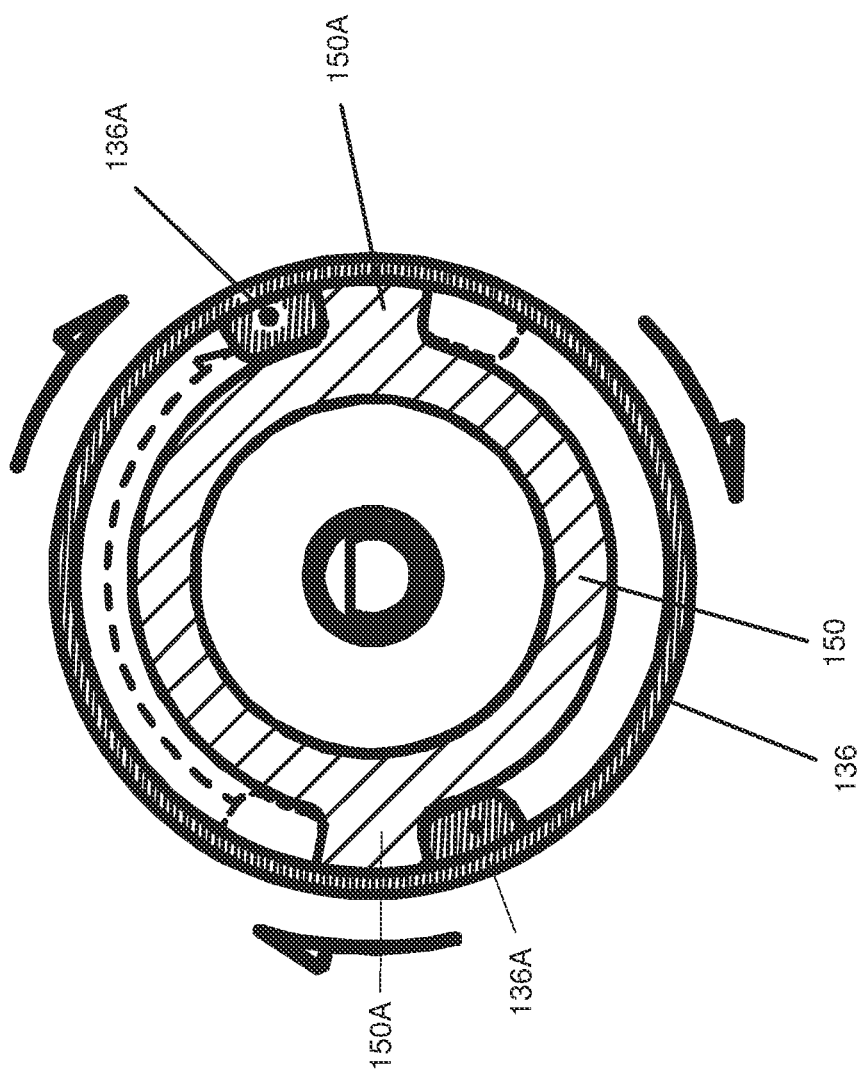
FIG. 20 is a partial cross-sectional view illustrating a first coupling and a cord drum in the control module during winding of the operating cord.

Referring to FIG. 20, as the cord drum 136 rotates reversely, the radial flange 136A of the cord drum 136 can contact and push against the opposing radial flange 150A of the first coupling 150, whereby the first coupling 150 can be synchronously driven to rotate relative to the second coupling 152.

Figure 21:
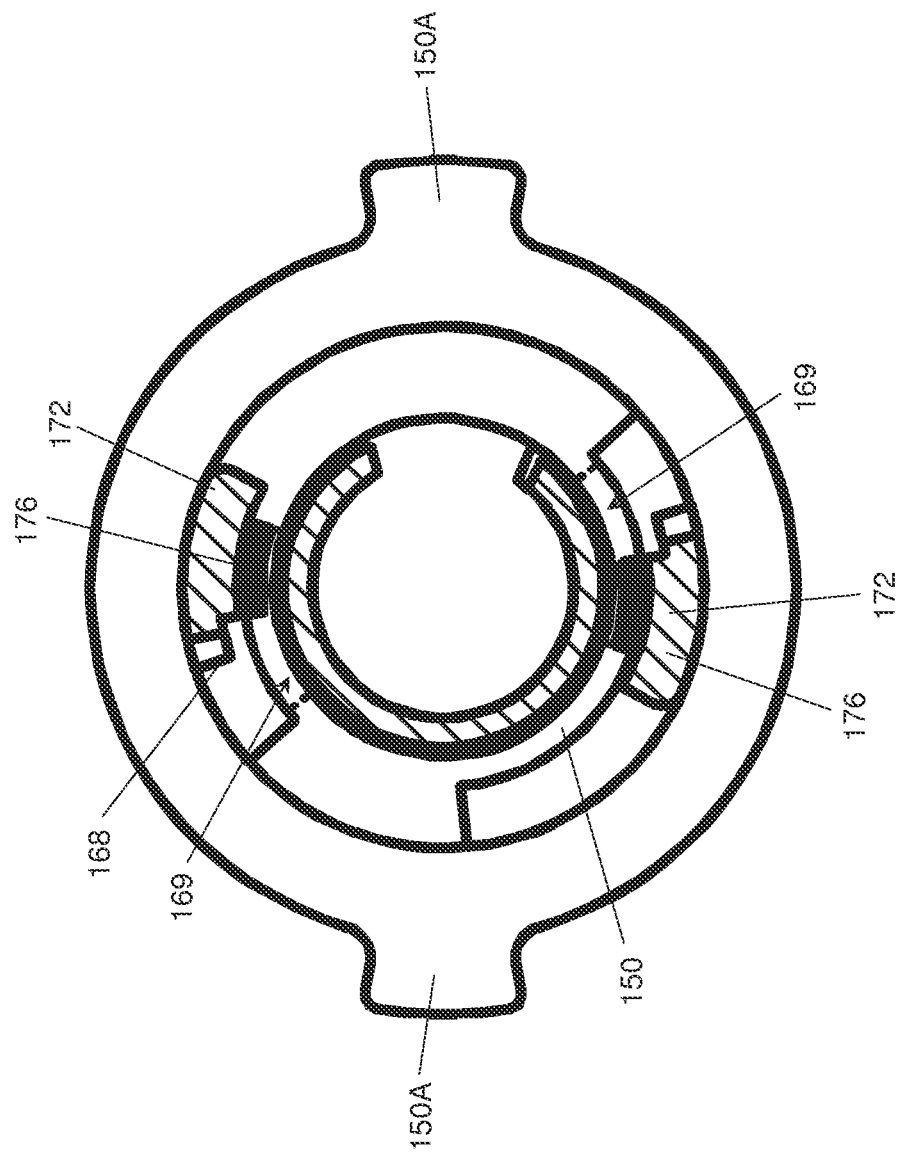
FIG. 21 is a partial cross-sectional view illustrating a first and a second coupling in the control module when the cord drum is winding the operating cord.
Figure 22:
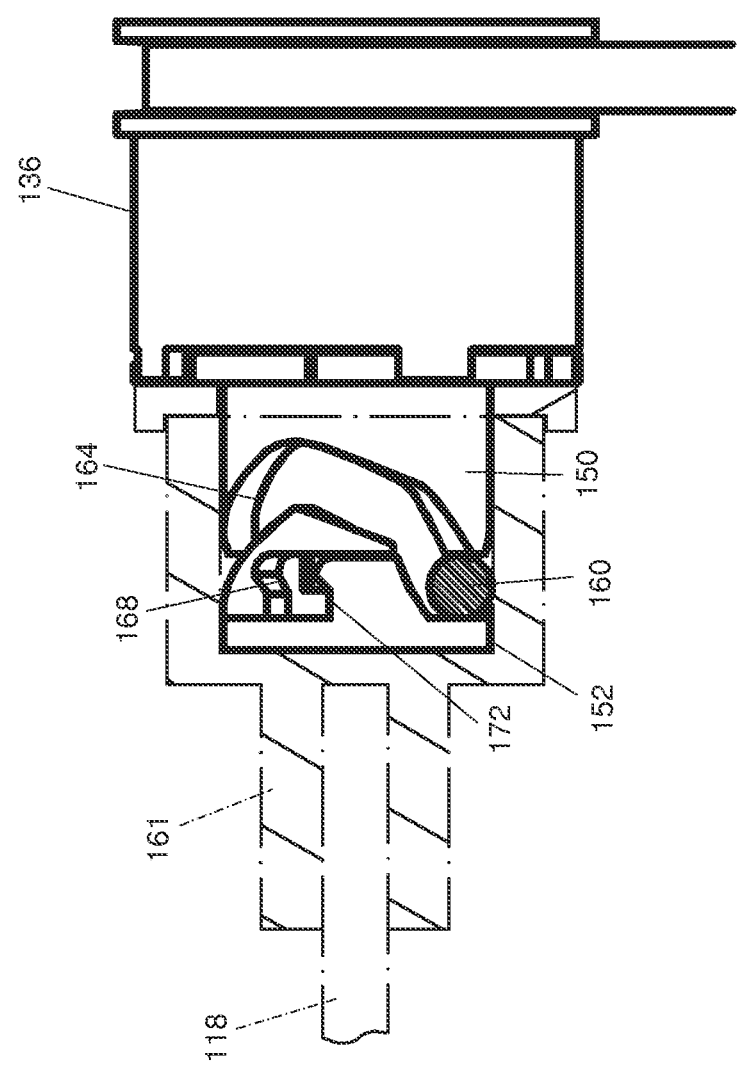
FIG. 22 is a schematic view illustrating a portion of the control module when the cord drum is winding the operating cord.
Figure 23:
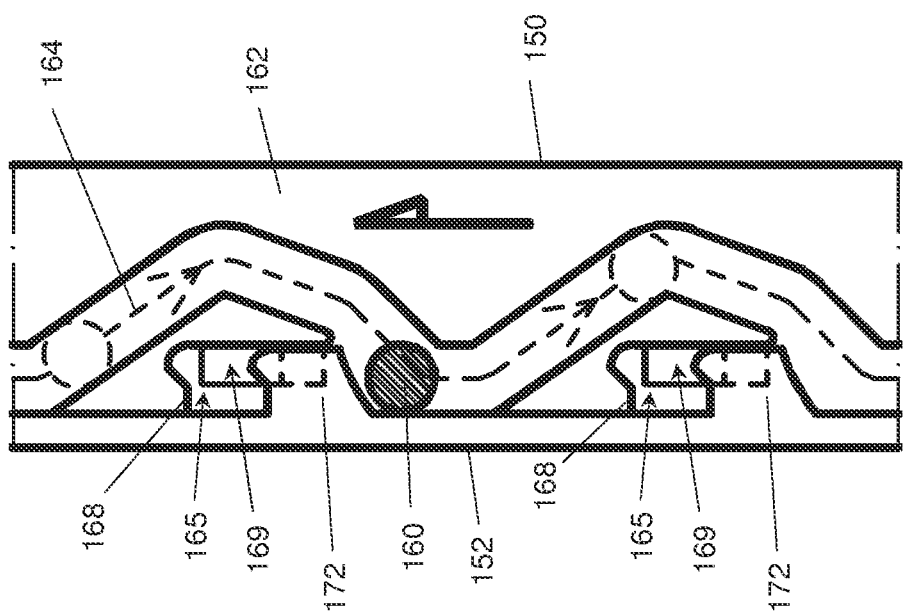
FIG. 23 is a schematic view illustrating a configuration of a guide track provided in the clutch when the cord drum is winding the operating cord.

Referring to FIGS. 21-23, the rotation of the first coupling 150 and the cord drum 136 can result in each radial abutment 168 of the first coupling 150 to move away from the radial rib 172 adjacent thereto, until the first coupling 150 reaches another abuttal position where no stop regions 177 are formed in the guide track 164 (as shown in FIGS. 22 and 23). As exemplary shown in FIG. 4, once the extension 176 abuts against a side edge 169A of the slot 169 (shown in FIG. 4), the guide track 164 can recover a configuration with no stop regions 177, and the clutch 138 can be turned to the decoupling state. Accordingly, the spring 140 can continue driving the cord drum 136 to rotate reversely for winding the operating cord 120, whereas the first and second couplings 150 and 152 can rotate synchronously. Because no stop regions 177 are formed in the guide track 164, the coupled rotation of the first and second couplings 150 and 152 can cause the rolling part 160 to slide along the guide track 164 and the radial slot 179 of the sleeve 161. As the first and second couplings 150 and 152 and the cord drum 136 rotate to wind the operating cord 120, the sleeve 161 and the drive axle 118 can be kept in a stationary state owing to the locking action exerted by the spring 180. Therefore, the bottom part 116 and the shading structure 114 can be respectively kept in their current position while the cord drum 136 is winding the operating cord 120. After the cord drum 136 has wound partially or entirely the operating cord 120 (the plug 192 can abut against a lower end of the actuator 122 when the cord drum 136 entirely winds the operating cord 120), the user can pull again the operating cord 120 downward to raise the shading structure 114. The aforementioned operating steps can be repeated multiple times, until the shading structure 114 rises to a desirable height.

Figure 24:
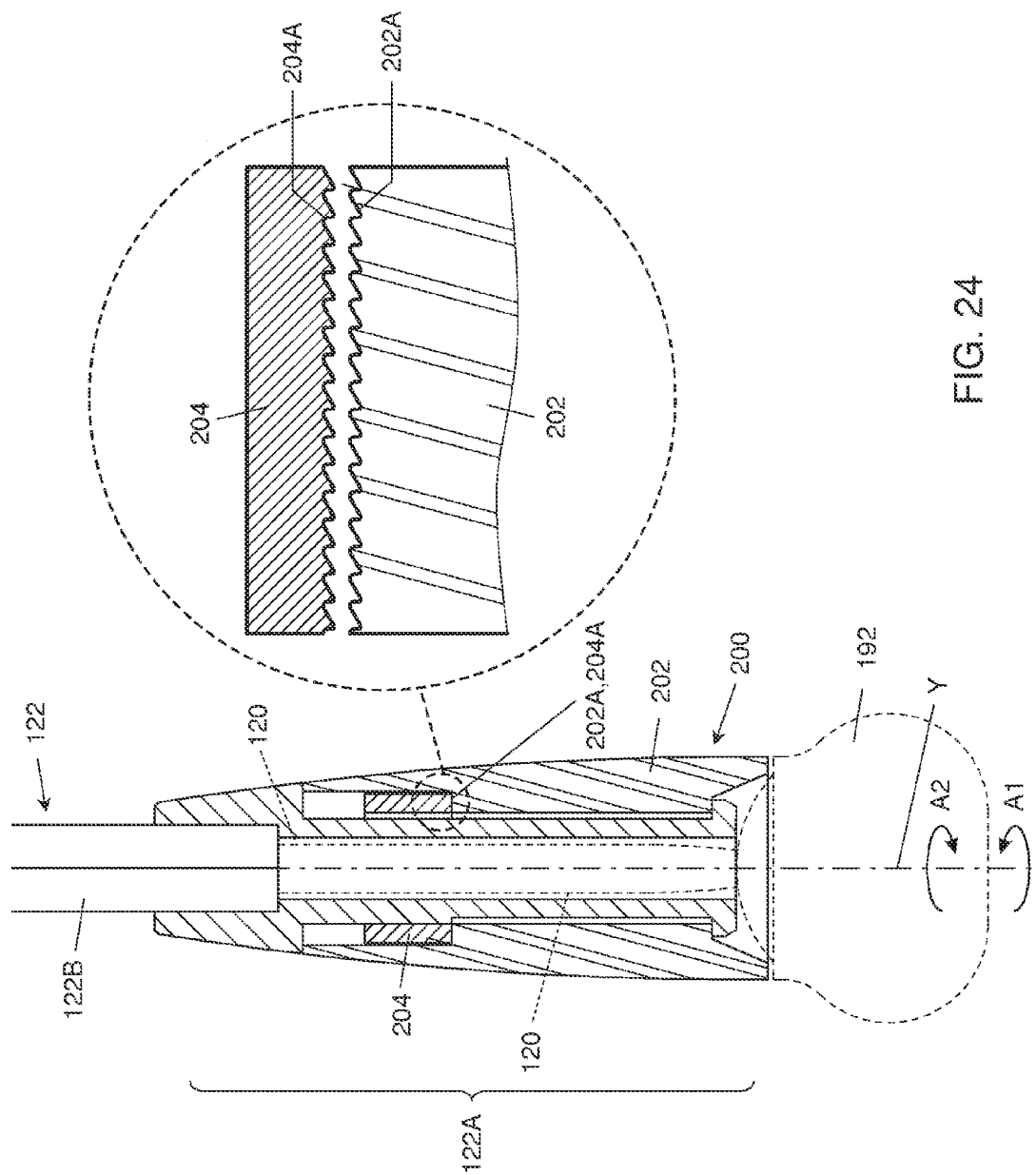
FIG. 24 is a cross-sectional view illustrating an actuator of the control module provided with a safety mechanism.

Referring to FIGS. 1 and 2 again, a lower portion 122A of the actuator 122 can have a thicker shape to facilitate grasping and manipulation of the actuator 122. To prevent erroneous operation that may damage internal component parts, the lower portion 122A can be provided with a safety mechanism 200 operable to selectively decouple the lower portion 122A. When the user intends to operate the actuator 122 by grasping and rotating the lower portion 122A in an incorrect direction, the safety mechanism 200 can decouple the rotation of the lower portion 122A, such that the displacement of the lower portion 122A cannot drive the release unit 134 to unlock. FIG. 24 is a schematic view illustrating an embodiment of the safety mechanism 200 assembled in the lower portion 122A.

As shown in FIG. 24, the actuator 122 can exemplary include a stick 122B. The safety mechanism 200 can include an outer drum 202, and an inner collar 204 assembled in an interior of the outer drum 202. The operating cord 120 can be respectively routed through an interior of the outer drum 202 and the inner collar 204. The outer drum 202 can be pivotally connected with the stick 122B of the actuator 122, such that the outer drum 202 can rotate relative to the stick 122B. The inner collar 204 in turn can be slidably assembled with the stick 122B. Accordingly, while the inner collar 204 and the stick 122B of the actuator 122 can rotate synchronously, the inner collar 204 can also move lengthwise relative to the stick 122B along a pivot axis Y of the actuator 122.

The outer drum 202 and the inner collar 204 can respectively have contacting surfaces 202A and 204A that can contact with each other. The contacting surfaces 202A and 204A can be substantially perpendicular to the pivot axis Y of the actuator 122, and can respectively include toothed protrusions that have engagement surfaces which can engage with one another only in one predetermined direction of rotation of the inner collar 204 and the outer drum 202 corresponding to the correct direction of rotation for lowering the shading structure.

When the outer drum 202 rotates in a direction A1, the surfaces 202A and 204A can engage with each other (in particular the engagement surfaces of the toothed protrusions thereon) such that the rotation of the outer drum 202 can drive the inner collar 204 and the actuator 122 to rotate synchronously, which corresponds to the correct direction of rotation for releasing the shading structure.

When the user rotates the outer drum 202 in a direction A2 opposite to the direction A1, the surfaces 202A and 204A can push against each other can cannot engage with each other. As a result, the inner collar 204 can displace up and down vertically in a reciprocated manner while the outer drum 202 rotates decoupled from the inner collar 204, which corresponds to the incorrect direction of rotation for releasing the shading structure. In this manner, the actuator 122 can be prevented from rotating in the incorrect direction during operation, which can prevent the release mechanism 134 from being damaged owing to erroneous actuation.

Figure 25:
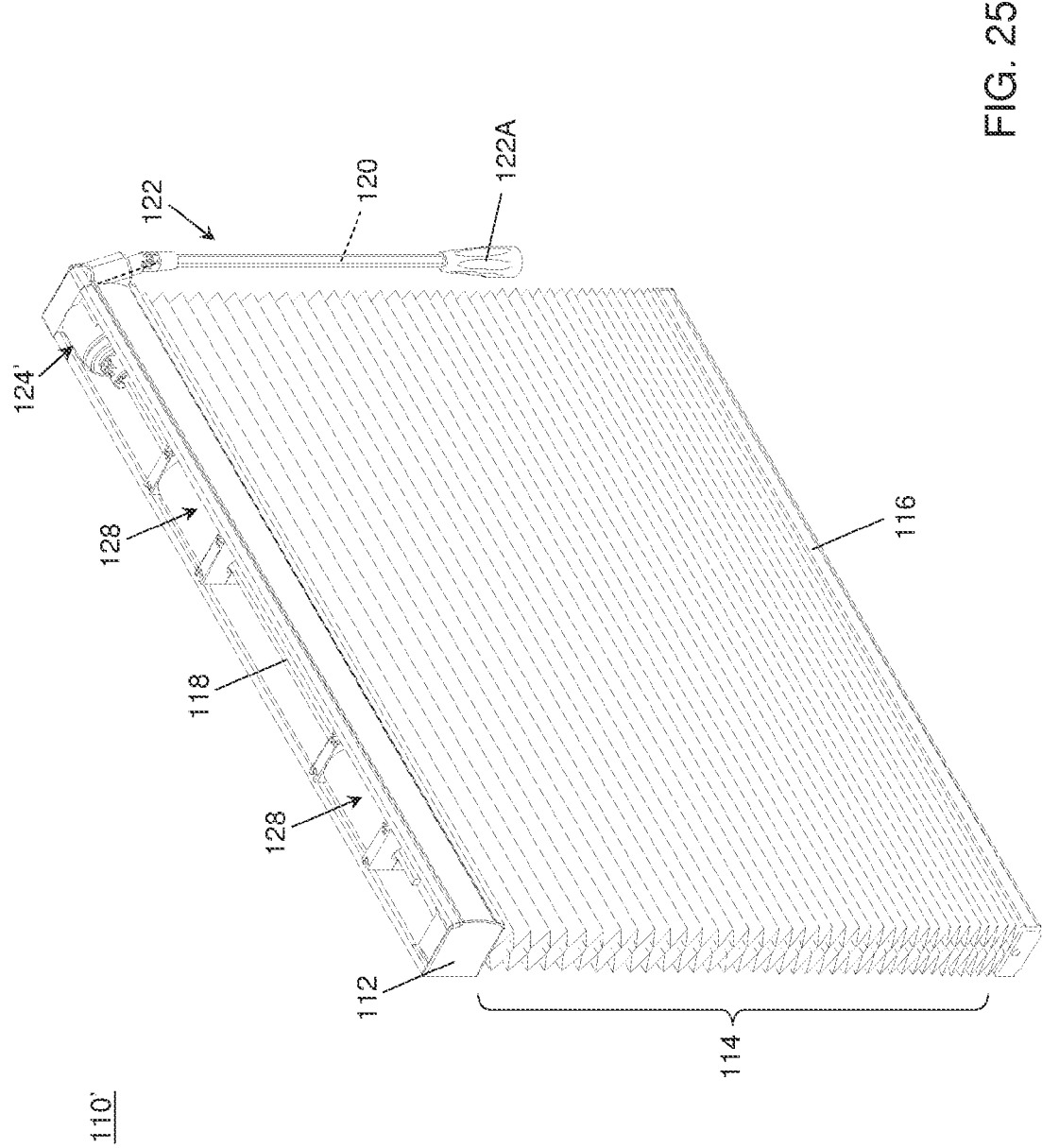
FIG. 25 is a schematic view illustrating another embodiment of a window shade.
Figure 26:
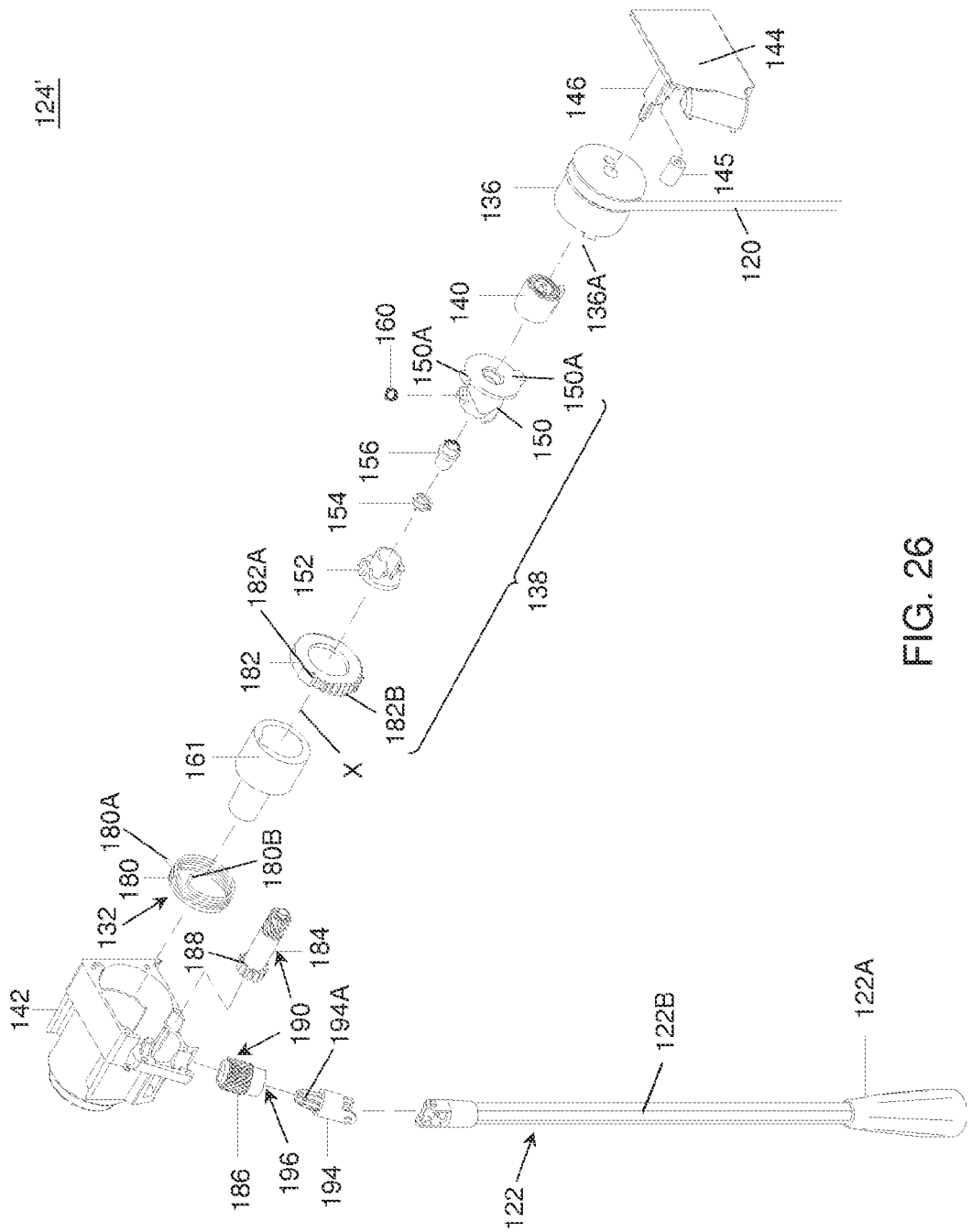
FIG. 26 is an exploded view illustrating a control module used in the window shade shown in FIG. 25.
Figure 27:
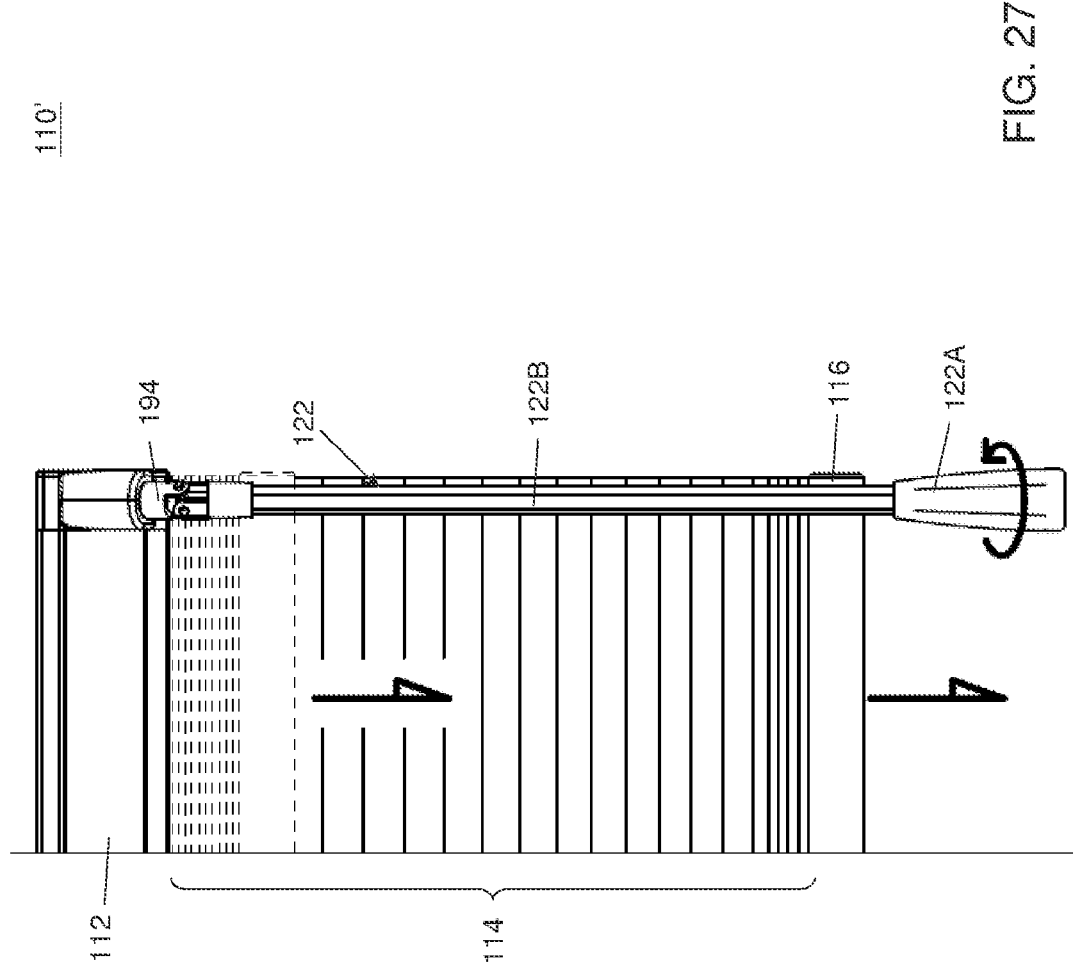
FIG. 27 is a schematic view illustrating an operation for lowering the window shade shown in FIG. 25.
Figure 28:
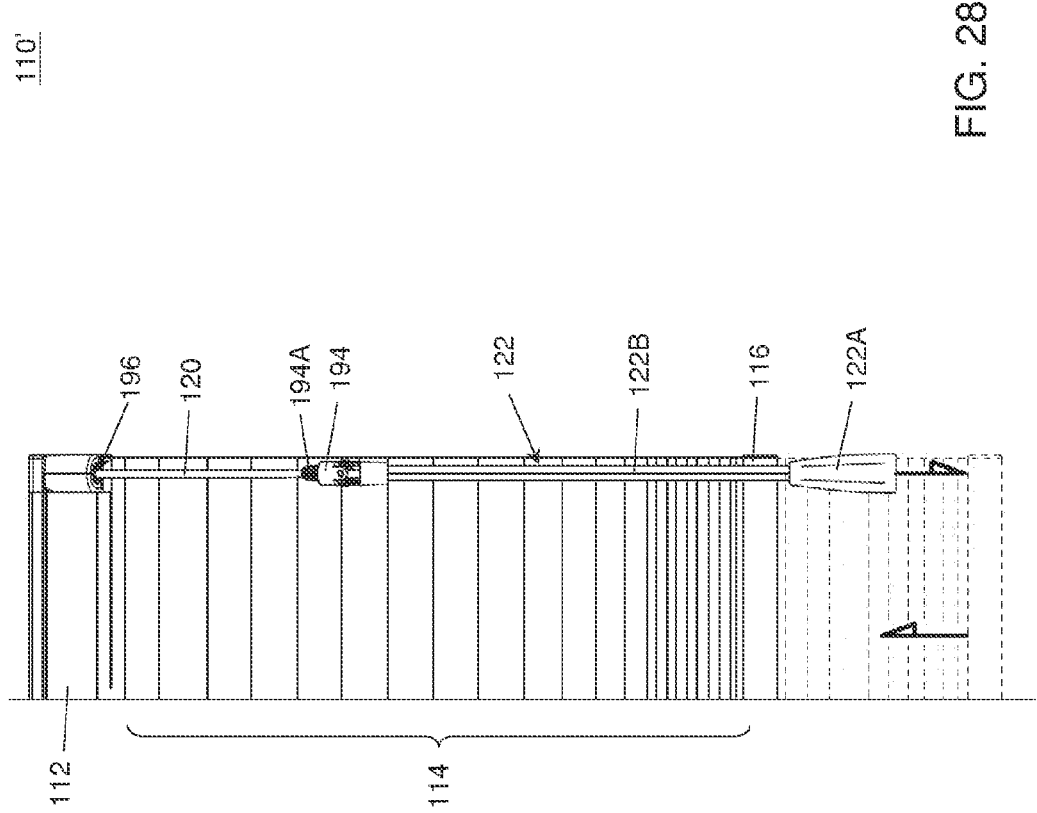
FIG. 28 is a schematic view illustrating an operation for raising the window shade shown in FIG. 25.

FIG. 25 is a schematic view illustrating another embodiment of a window shade 110', FIG. 26 is an exploded view illustrating a control module 124' used in the window shade 110', FIG. 27 is a schematic view illustrating an operation for lowering the window shade 110', and FIG. 28 is a schematic view illustrating an operation for raising the window shade 110'. As shown in FIGS. 25-28, one difference of the window shade 110' compared to the window shade 110 lies in the connection between the operating cord 120 with the actuator 122 in the control module 124'. In one embodiment, the transmission member 186 can have a hollow body. The operating cord 120 can pass through the transmission member 186, and then affix with the actuator 122. Accordingly, downward pulling of the actuator 122 can synchronously drive the operating cord 120 in movement.

Moreover, an upper end of the actuator 122 can be provided with a plug 194. In one embodiment, the plug 194 can be pivotally connected with an upper end of the stick 122B. The plug 194 can have a toothed portion 194A.

The transmission member 186 can have a cavity 196 (shown in FIG. 28) with which the toothed portion 194A can detachably engage. The other end portion of the transmission member 184 can be similar in construction to the previously described embodiment and engage with the transmission member 186 via the gear transmission 190, which can include a helicoid gear, a worm gear, and the like. When the actuator 122 is engaged with the transmission member 186 via the plug 194, the actuator 122 can be operable to drive the transmission member 186 to rotate through engagement of the toothed portion 194A of the plug 194 with the transmission member 186. When the actuator 122 is displaced downward, the plug 194 (in particular the toothed portion 194A) can disengage from the transmission member 186.

Other parts of the control module 124' and the window shade 110' can be similar to the embodiments described previously.

When the actuator 122 is not manipulated by a user, the spring 180 of the arrester 132 can tighten around the sleeve 161 to block rotation of the drive axle 118. The shading structure 114 can be thereby held at a fixed position. Owing to the action of the spring 140, the cord drum 136 can pull on the operating cord 120, which can cause the plug 194 to insert and engage through the transmission member 186.

In conjunction with FIGS. 25 and 26, FIG. 27 is a schematic view illustrating an operation for lowering the window shade 110'. As shown in FIG. 27, when the bottom part 116 is to be lowered, the actuator 122 can be gently rotated. Owing to the movement transmission through the toothed portion 194A and the transmission members 184 and 186, the collar 182 can be driven to rotate an angle and displace the second prong 180B of the spring 180 to loosen the spring 180. The arrester 132 can accordingly turn to the release state. The bottom part 116 then can lower by gravity action as described previously until it reaches a desired height. Once the bottom part 116 reaches the desired height, the actuator 122 can be released, and the spring 180 can recover its tightening state for holding the bottom part 116 at the desired position.

As shown in FIG. 28, when the bottom part 116 is to be raised, the actuator 122 can be pulled downward, whereby the plug 194 can disengage from the cavity 196 of the transmission member 186 and the operating cord 120 can unwind from the cord drum 136. As described previously, the cord drum 136 can rotate in the direction for unwinding the operating cord 120, this rotational displacement of the cord drum 136 being transmitted via the clutch 138 to the sleeve 161 and the drive axle 118. In turn, the rotation of the sleeve 161 can urge the first prong 180A of the spring 180 to abut against an inner surface of the housing 142, which results in the spring 180 turning from the tightening state on sleeve 161 to the loosening state. The arrester 132 can thereby turn to the release state. Accordingly, by pulling down the actuator 122, the cord drum 136 and the drive axle 118 can be driven to rotate synchronously for raising the bottom part 116.

While the bottom part 116 is rising, the actuator 122 can be released at any time. When the actuator 122 is released, the spring 180 can recover its tightening state on the sleeve 161 to lock and block rotation of the sleeve 161 and drive axle 118. The shading structure 114 can be thereby held at the desired height. When the actuator 122 is released, the spring 140 can also drive reverse rotation of the cord drum 136 for winding the operating cord 120. While the cord drum 136 is winding the operating cord 120, the actuator 122 can concurrently move upward until the plug 194 inserts through the cavity 196 to engage with the transmission member 186.

Figure 29:
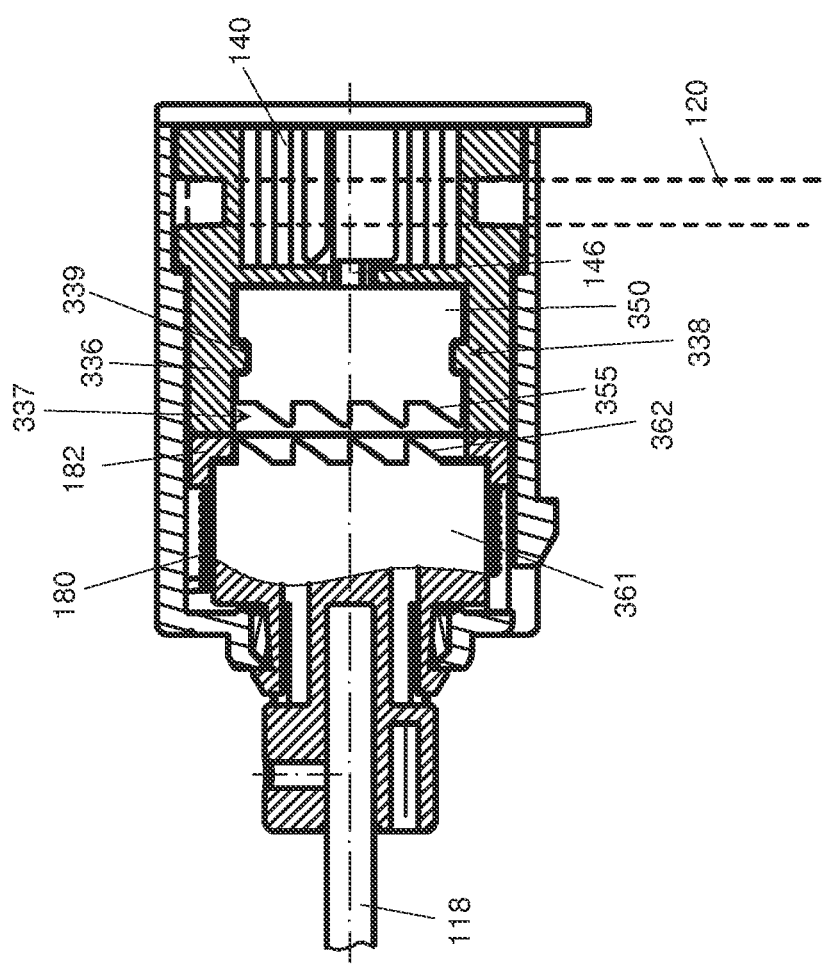
FIG. 29 is a partial cross-sectional view illustrating another embodiment of a control module used in a window shade.

FIGS. 29-33 are schematic views illustrating another embodiment of a control module 324. As shown in FIG. 29, one difference of the control module 324 from the previous embodiments lies in the construction of the clutch 338. In this embodiment, the clutch 338 can include a movable coupling 350 that is assembled with the fixed shaft 146. The coupling 350 can rotate relative to the fixed shaft 146, and can move lengthwise along the axis of the fixed shaft 146.

Figure 30:
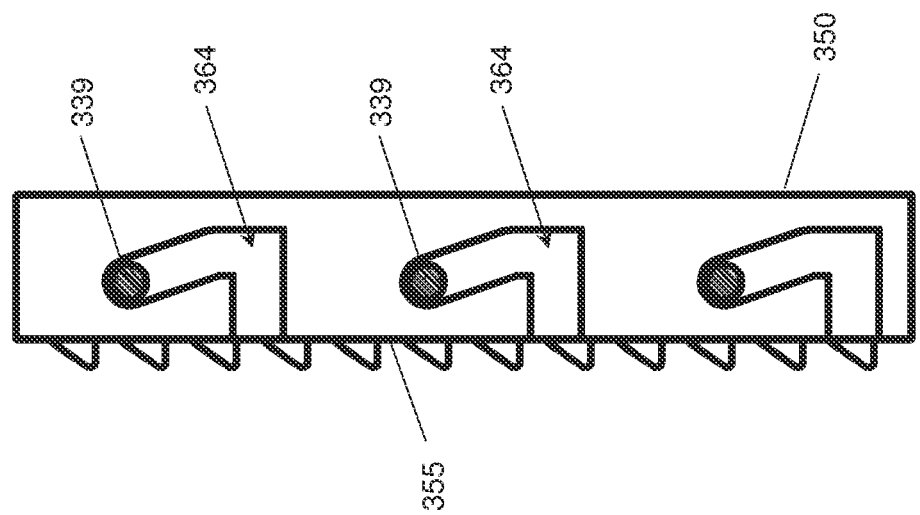
FIG. 30 is schematic view illustrating a portion of a clutch provided in the control module shown in FIG. 29.

FIG. 30 is a schematic projection view of an outer portion of the coupling 350. An outer surface of the coupling 350 can be formed with one or more guide track 364 (three guide tracks 364 are exemplary shown in FIG. 30). Moreover, a side of the coupling 350 facing the sleeve 161 can be formed with a toothed surface 355.

Referring to FIGS. 29 and 30, the cord drum 136 connected with the operating cord 120 can have a circular inner cavity 337 with an inner sidewall formed with one or more protrusion 339. The coupling 350 can be assembled through the inner cavity 337 such that each protrusion 339 can be received and movably guided through one associated guide track 364. The interaction between the protrusion 339 and the guide track 364 can operatively turn a rotational displacement of the cord drum 336 into concurrent rotation and lengthwise displacement of the coupling 350 relative to the cord drum 336, which can drive the coupling 350 to move toward or away from the sleeve 361. In addition, the sleeve 361 affixed with the drive axle 118 can have a side facing the coupling 350 formed with a toothed surface 362. During operation, the toothed surface 362 of the sleeve 361 can engage with the toothed surface 355 of the coupling 350.

With respect to the arrester, the release unit and other parts, the same constructions as described previously may be applied.

Figure 31:
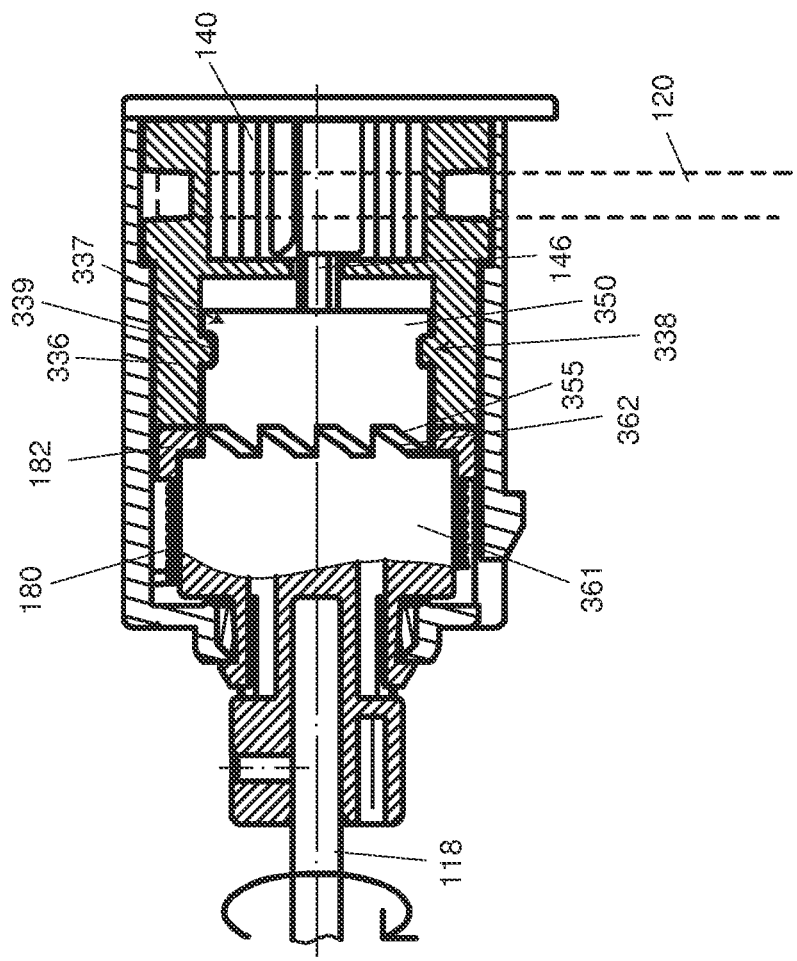
FIG. 31 is a partial cross-sectional view illustrating the control module shown in FIG. 29 during raising of the window shade.
Figure 32:
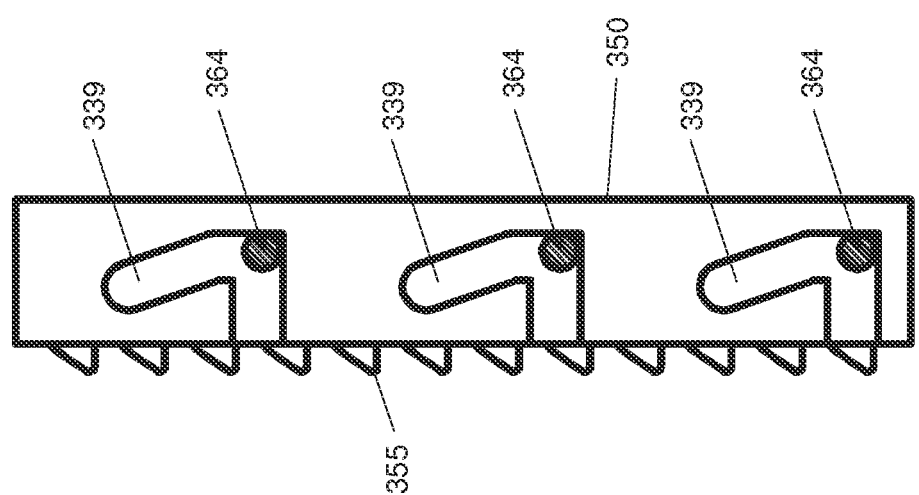
FIG. 32 is a schematic view illustrating a portion of the clutch in the control module shown in FIG. 31.

FIGS. 31 and 32 are schematic views illustrating an operation for of the control module 324 for raising the shading structure. When the operating cord 120 is pulled downward, the cord drum 336 can rotate, which can drive the coupling 350 to concurrently rotate and move toward the sleeve 361 via the interaction of the protrusion 339 and the guide track 364 until the toothed surfaces 362 and 355 engage with each other. Once the coupling 350 engages with the sleeve 361, the continuous rotation of the cord drum 336 can drive the sleeve 361 and the drive axle 118 to rotate for raising the bottom part 116 (as shown in FIG. 1).

Figure 33:
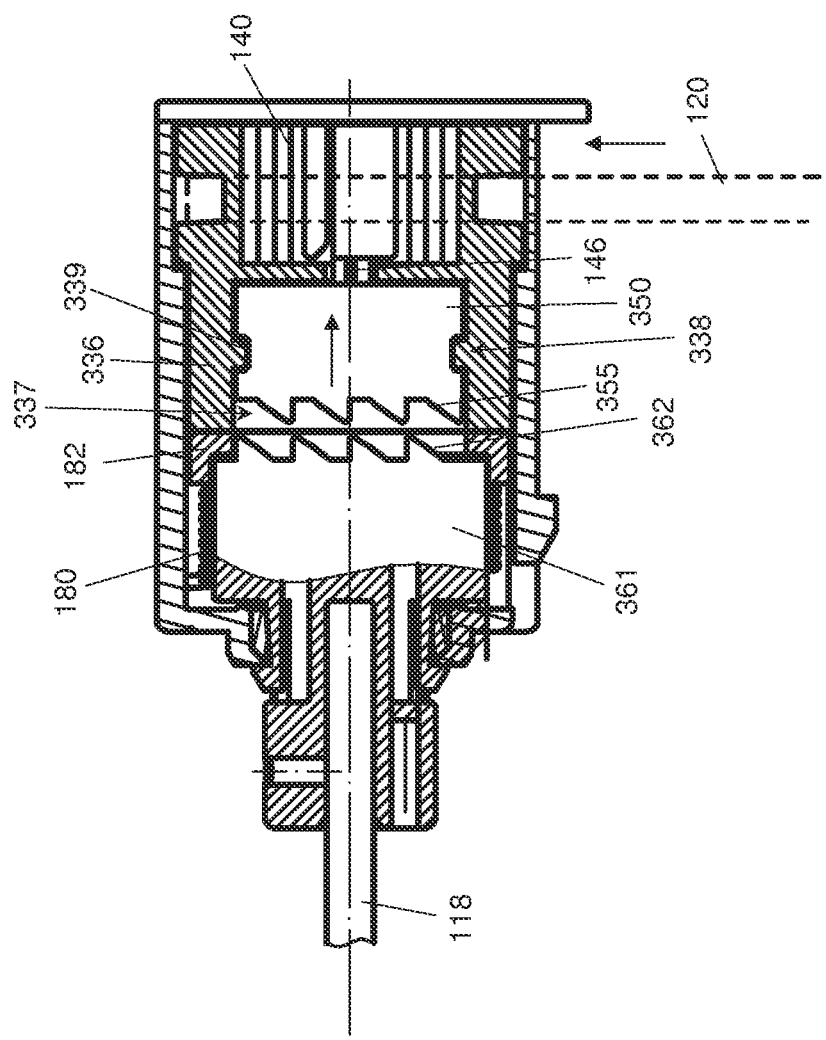
FIG. 33 is a partial cross-sectional view illustrating the control module shown in FIG. 29 when the window shade is winding the operating cord.

FIGS. 33 and 34 are schematic views illustrating an operation of the control module 324 for winding the operating cord 120. While it acts to wind the operating cord 120, the spring 140 can drive the cord drum 336 to rotate reversely, which in turn can drive the coupling 350 to move away from the sleeve 361 via the interaction between the protrusion 339 and the guide track 364. As a result, the toothed surface 362 of the sleeve 361 can disengage from the toothed surface 355 of the coupling 350. Accordingly, the rotation of the cord drum 336 can be decoupled, such that the sleeve 361 and the drive axle 118 can be locked and kept stationary by the spring 180 of the arrester while the cord drum 336 is winding the operating cord 120.

It is worth noting that the safety mechanism 200 described previously with reference to FIG. 24 can be suitable for use in combination with any control modules. In the embodiment shown in FIGS. 25-33, the same safety mechanism 200 can thus be assembled with the lower portion 122A of the actuator 122 to prevent the actuator 122 from rotating in an incorrect direction for driving the release unit.

With the structures and operating methods described herein, the arrester of the control module can be turned from the locking state to the release state by rotating an actuator, whereby the shading structure can lower by gravity action. The window shades described herein thus can be convenient to operate.

Realizations of the structures and methods have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. A control module of a window shade, comprising:
   a drive axle affixed with a sleeve;
   an arrester assembled around the sleeve, the arrester having a locking state in which the arrester blocks rotation of the sleeve and the drive axle to keep a shading structure of the window shade at a desired position, and an unlocking state in which rotation of the sleeve and the drive axle is allowed for vertical adjustment of the shading structure;

a release unit including an actuator that is operatively connected with the arrester, the actuator including a stick having an elongated shape extending along a lengthwise axis;

a cord drum and an operating cord connected with each other; and a clutch operatively connected with the cord drum, the clutch being operable to couple and decouple the cord drum with respect to the drive axle;

wherein the operating cord is pulled to drive the cord drum in rotation and turn the clutch to a coupling state, such that the rotation of the cord drum is transmitted through the clutch in the coupling state to drive the sleeve and the drive axle in rotation for switching the arrester to the unlocking state and raising the shading structure, and the stick is rotatable about the lengthwise axis to switch the arrester from the locking state to the unlocking state for lowering of the shading structure by gravity action.

2. The control module according to claim 1, wherein the operating cord extends through an interior of the stick, the cord drum being spring biased for winding the operating cord so as to position an end of the operating cord adjacent to a lower end of the stick while the arrester is in the locking state, and the end of the operating cord is pulled away from the lower end of the stick for raising a shading structure of a window shade.

3. The control module according to claim 1, wherein the arrester includes a spring mounted around the sleeve, the spring tightening on the sleeve when the arrester is in the locking state, and the spring loosening when the arrester is in the unlocking state, the sleeve and the drive axle being rotatable in unison relative to the spring in the unlocking state.

4. The control module according to claim 3, wherein a pulling action on the operating cord causes the spring to switch to the unlocking state and raises a shading structure of a window shade, and the spring is the locking state and the clutch is in a decoupling state while the cord drum rotates for winding the operating cord.

5. The control module according to claim 4, wherein the cord drum is connected with another spring configured to bias the cord drum in rotation for winding the operating cord.

6. The control module according to claim 3, wherein the release unit further includes:

a collar operable to rotate about a rotation axis of the drive axle, the collar being affixed with one end of the spring; and a plurality of transmission members connected between the collar and the stick, the collar being in gear engagement with one of the transmission members, wherein a rotation of the stick about the lengthwise axis is transmitted via the transmission members and drives a rotational displacement of the collar about the rotation axis of the drive axle to cause the spring to loosen.

7. The control module according to claim 6, wherein the transmission members include a first and a second transmission member, the collar has a toothed portion that engages with the first transmission member, and the second transmission member is connected with the actuator and engages with the first transmission member via a gear transmission, the gear transmission including a helicoid gear, and a worm gear.

8. The control module according to claim 7, wherein the operating cord is affixed with the stick such that a downward displacement of the stick pulls the operating cord downward, and an upper end of the stick is further connected with a plug, the plug being movable with the stick to engage and disengage the second transmission member.

9. The control module according to claim 8, wherein the stick is operable to drive rotation of the second transmission member when the plug is engaged with the second transmission member, and the plug disengages from the second transmission member when the stick is pulled downward.

10. A window shade comprising:

a head rail;

a shading structure;

a bottom part disposed at a lowermost end of the shading structure;

a plurality of suspension cords connected with the head rail and the bottom part;

a plurality of cord winding units assembled with the head rail and connected with the suspension cords; and the control module according to claim 1 assembled with the head rail, the drive axle of the control module being respectively coupled with the cord winding units.

11. A control module of a window shade, comprising:

a drive axle affixed with a sleeve;

a spring assembled around the sleeve, the spring having a locking state in which the spring blocks a rotational displacement of the sleeve and the drive axle to keep a shading structure of a window shade at a desired position, and an unlocking state in which rotation of the sleeve and the drive axle is allowed for vertical adjustment of the shading structure;

a release unit including a collar, a stick having an elongated shape, and a plurality of transmission members operatively connected with the collar and the stick, the collar being rotatable about a rotation axis of the drive axle and affixed with an end of the spring, and the collar being in gear engagement with one of the transmission members;

a cord drum and an operating cord connected with each other; and a clutch operatively connected with the cord drum, the clutch being operable to couple and decouple the cord drum with respect to the drive axle;

wherein the operating cord is pulled to drive the cord drum in rotation and turn the clutch to a coupling state, such that the rotation of the cord drum is transmitted through the clutch in the coupling state to drive the sleeve and the drive axle in rotation for switching the spring to the unlocking state and raising the shading structure, and the stick is operable to cause the collar to rotate for switching the spring from the locking state to the unlocking state so that the shading structure is allowed to lower by gravity action.

12. The control module according to claim 11, wherein the operating cord extends through an interior of the stick, the cord drum being spring biased for winding the operating cord so as to position an end of the operating cord adjacent to a lower end of the stick while the spring is in the locking state, and the end of the operating cord is pulled away from the lower end of the stick for raising a shading structure of a window shade.

13. The control module according to claim 11, wherein the spring tightens on the sleeve in the locking state and loosens in the unlocking state.

14. The control module according to claim 11, wherein the spring is in the locking state and the clutch is in a decoupling state while the cord drum rotates for winding the operating cord.

15. The control module according to claim 14, wherein the cord drum is connected with another spring configured to bias the cord drum in rotation for winding the operating cord.

16. The control module according to claim 11, wherein the elongated shape of the stick extends along a lengthwise axis about which the stick is rotatable, a rotation of the stick about the lengthwise axis being transmitted via the transmission members for driving a rotational displacement of the collar to cause the spring to loosen.

17. The control module according to claim 11, wherein the transmission members include a first and a second transmission member, the collar has a toothed portion that engages with the first transmission member, and the second transmission member is operatively connected with the stick and engages with the first transmission member via a gear transmission, the gear transmission including a helicoid gear, and a worm gear.

18. The control module according to claim 17, wherein the operating cord is affixed with the stick such that a downward displacement of the stick pulls the operating cord downward, and an upper end of the stick is further connected with a plug, the plug being movable with the stick to engage and disengage the second transmission member.

19. The control module according to claim 18, wherein the stick is operable to drive rotation of the second transmission member when the plug is engaged with the second transmission member, and the plug disengages from the second transmission member when the stick is pulled downward.

20. A window shade comprising:
a head rail;
a shading structure;
a bottom part disposed at a lowermost end of the shading structure;
a plurality of suspension cords connected with the head rail and the bottom part;
a plurality of cord winding units assembled with the head rail and connected with the suspension cords; and
the control module according to claim 11 assembled with the head rail, the drive axle of the control module being respectively coupled with the cord winding units.

* * * * *